(12) United States Patent
Obayashi et al.

(10) Patent No.: US 10,977,845 B2
(45) Date of Patent: Apr. 13, 2021

(54) IMAGE PROCESSING APPARATUS AND CONTROL METHOD

(71) Applicant: CANON KABUSHIKI KAISHA, Tokyo (JP)

(72) Inventors: Masaaki Obayashi, Kawasaki (JP); Shinjiro Hori, Yokohama (JP); Hiroyasu Kunieda, Yokohama (JP); Mizuki Hayakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 137 days.

(21) Appl. No.: 16/147,046

(22) Filed: Sep. 28, 2018

(65) Prior Publication Data

US 2019/0102926 A1   Apr. 4, 2019

(30) Foreign Application Priority Data

Oct. 3, 2017   (JP) .............................. JP2017-193784

(51) Int. Cl.
| | |
|---|---|
| *H04N 1/00* | (2006.01) |
| *G06T 11/60* | (2006.01) |
| *G06F 3/0484* | (2013.01) |
| *G06F 3/0481* | (2013.01) |

(52) U.S. Cl.
CPC ............ *G06T 11/60* (2013.01); *G06F 3/0481* (2013.01); *G06F 3/0484* (2013.01); *G06T 2200/24* (2013.01); *H04N 1/00137* (2013.01); *H04N 1/00167* (2013.01); *H04N 1/00188* (2013.01); *H04N 1/00196* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0154819 A1* | 10/2002 | Campbell | ............ | G06K 9/6211 382/209 |
| 2009/0129680 A1* | 5/2009 | Nozaki | ................. | G06F 40/186 382/195 |
| 2009/0254813 A1* | 10/2009 | Kobayashi | ............. | H04N 1/387 715/243 |
| 2010/0095204 A1* | 4/2010 | Kobayashi | ............ | G06F 40/103 715/700 |
| 2010/0158412 A1* | 6/2010 | Wang | ................. | G06K 9/00624 382/305 |
| 2012/0020648 A1* | 1/2012 | Yamaji | ................. | G11B 27/034 386/278 |
| 2012/0117473 A1* | 5/2012 | Han | ..................... | G11B 27/034 715/723 |

(Continued)

FOREIGN PATENT DOCUMENTS

JP          5449460 B2      3/2014

*Primary Examiner* — Hien L Duong
(74) *Attorney, Agent, or Firm* — Canon U.S.A., Inc. IP Division

(57) ABSTRACT

A control method includes executing, in a case that a change instruction is accepted, at least a process for displaying a first post-change layout image on a display unit with a priority over a second post-change layout image with a higher degree of similarity to the pre-change layout image than the first post-change layout image or a process for displaying the first post-change layout image on the display unit in a more emphasized manner than the second post-change layout image.

17 Claims, 14 Drawing Sheets

(56) References Cited

U.S. PATENT DOCUMENTS

| | | | |
|---|---|---|---|
| 2012/0239506 A1* | 9/2012 | Saunders | G06Q 30/02 705/14.67 |
| 2012/0294514 A1* | 11/2012 | Saunders | G06K 9/00677 382/159 |
| 2014/0010444 A1* | 1/2014 | Sasaki | G06T 11/60 382/165 |
| 2014/0193047 A1* | 7/2014 | Grosz | G06Q 30/0241 382/118 |
| 2014/0195921 A1* | 7/2014 | Grosz | G06F 3/1242 715/738 |
| 2015/0063724 A1* | 3/2015 | Ikeda | G06F 16/5854 382/305 |
| 2015/0086116 A1* | 3/2015 | Yamaji | G06K 9/00684 382/190 |
| 2015/0242374 A1* | 8/2015 | Kong | G06F 40/106 715/201 |
| 2018/0150446 A1* | 5/2018 | Sivaji | G06F 40/106 |
| 2019/0104221 A1* | 4/2019 | Hayakawa | H04N 1/00196 |

* cited by examiner

FIG. 5

| IMAGE ID | SHOOTING DATE AND TIME | FOCUS | NUMBER OF FACES | PERSONAL ID ||||||| ... |
|---|---|---|---|---|---|---|---|---|---|---|
| | | | | 1 ||  2 || 3 || |
| | | | | UPPER LEFT POSITION | LOWER RIGHT POSITION | UPPER LEFT POSITION | LOWER RIGHT POSITION | UPPER LEFT POSITION | LOWER RIGHT POSITION | |
| 1 | 2015/7/1 10h11m12s | ○ | 6 | 40, 40 | 65, 65 | 90, 40 | 115, 65 | 10, 20 | 25, 35 | ... |
| 2 | 2015/7/1 10h12m30s | ○ | 2 | 50, 100 | 100, 150 | 150, 150 | 190, 165 | 150, 125 | 190, 165 | ... |
| 3 | 2015/7/1 10h15m54s | ○ | 0 | – | – | – | – | – | – | ... |
| ... | ... | ... | ... | ... | ... | ... | ... | ... | ... | ... |

FIG. 7

| SCENE | SHOOTING PERIOD (TIME) | | NUMBER OF PICTURES | | NUMBER OF PERSONS IN PICTURES | |
|---|---|---|---|---|---|---|
| | AVERAGE | STANDARD DEVIATION | AVERAGE | STANDARD DEVIATION | AVERAGE | STANDARD DEVIATION |
| TRAVEL | 33.221 | 4.778 | 324.857 | 393.691 | 1.506 | 0.256 |
| DAILY LIFE | 3.336 | 4.671 | 54.892 | 108.805 | 1.465 | 0.974 |
| CEREMONY | 4.634 | 1.532 | 165.457 | 71.055 | 2.547 | 0.527 |

FIG. 8A

| SCENE | FEATURES OF IMAGES IN MAIN SLOTS | FEATURES OF IMAGES IN SUB SLOTS |
|---|---|---|
| TRAVEL | LONG-SHOT IMAGES OF PERSON AND LANDSCAPE | CLOSEUP IMAGES AND PROFILE IMAGES |
| DAILY LIFE | CLOSEUP IMAGES AND PROFILE IMAGES | LONG-SHOT IMAGES OF PERSON AND LANDSCAPE |
| CEREMONY | IMAGES OF TWO PERSONS IN CLOSE | IMAGES OF MANY PEOPLE |

FIG. 8B

| IMAGE ID | SCORE (MAXIMUM 50) | |
|---|---|---|
| | MAIN SLOT (SCORE) | SUB SLOT (SCORE) |
| 1 | 20 | 40 |
| 2 | 45 | 10 |
| 3 | 10 | 20 |
| ... | ... | ... |

FIG. 9A
FIG. 9B
FIG. 9C
FIG. 9D
FIG. 9E
FIG. 9F
FIG. 9G
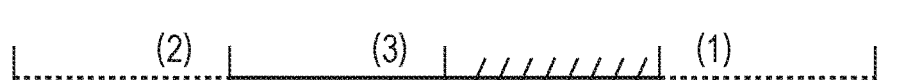
FIG. 9H
FIG. 9I

FIG. 13A

|   | a | b | c | d | e | f | g | h | i | j | k | l | m | n | o | p |
|---|---|---|---|---|---|---|---|---|---|---|---|---|---|---|---|---|
| a |   | 0.58 | 0.58 | 0.82 | 0.58 | 0.82 | 0.82 | 1.01 | 0 | 0.58 | 0.58 | 0.82 | 0.58 | 0.82 | 0.82 | 1.01 |
| b |   |   | 0.82 | 0.58 | 0.82 | 0.58 | 1.01 | 0.82 | 0.58 | 0.82 | 0.82 | 0.58 | 0 | 0.58 | 1.01 | 0.82 |
| c |   |   |   | 0.58 | 0.82 | 1.01 | 0.58 | 0.82 | 0.58 | 0 | 0.82 | 0.58 | 0.82 | 0.58 | 1.01 | 0.82 |
| d |   |   |   |   | ... | ... | ... | ... | ... | ... | ... | ... | ... | ... | ... | ... |
| e |   |   |   |   |   | ... | ... | ... | ... | ... | ... | ... | ... | ... | ... | ... |
| f |   |   |   |   |   |   | ... | ... | ... | ... | ... | ... | ... | ... | ... | ... |
| g |   |   |   |   |   |   |   | ... | ... | ... | ... | ... | ... | ... | ... | ... |
| h |   |   |   |   |   |   |   |   | ... | ... | ... | ... | ... | ... | ... | ... |
| i |   |   |   |   |   |   |   |   |   | ... | ... | ... | ... | ... | ... | ... |
| j |   |   |   |   |   |   |   |   |   |   | ... | ... | ... | ... | ... | ... |
| k |   |   |   |   |   |   |   |   |   |   |   | ... | ... | ... | ... | ... |
| l |   |   |   |   |   |   |   |   |   |   |   |   | ... | ... | ... | ... |
| m |   |   |   |   |   |   |   |   |   |   |   |   |   | ... | ... | ... |
| n |   |   |   |   |   |   |   |   |   |   |   |   |   |   | ... | ... |
| o |   |   |   |   |   |   |   |   |   |   |   |   |   |   |   | ... |
| p |   |   |   |   |   |   |   |   |   |   |   |   |   |   |   |   |

FIG. 13B

| h | p | d | f | g | l | n | o | b | c | e | j | k | m | i | a |
|---|---|---|---|---|---|---|---|---|---|---|---|---|---|---|---|
| 1.01 | 1.01 | 0.82 | 0.82 | 0.82 | 0.82 | 0.82 | 0.82 | 0.58 | 0.58 | 0.58 | 0.58 | 0.58 | 0.58 | 0 | 0 |

IMAGE PROCESSING APPARATUS AND CONTROL METHOD

BACKGROUND

Field of the Disclosure

The present disclosure generally relates to image processing and, more particularly, to an image processing apparatus and a control method.

Description of the Related Art

There is known a process for generating a layout image by arranging images represented by image data acquired by taking pictures with a digital camera or the like on a template. There is also known a layout image change process by which the generated layout image is changed in response to user instructions to display a new layout image. Japanese Patent No. 5449460 describes that a user is prompted to select any of a plurality of templates displayed on a screen. It also describes that a template used for a layout image generated by automatic layout is changed to the template selected by the user and a new layout image is displayed.

However, according to the technique described in Japanese Patent No. 5449460, the user is caused to select any of the plurality of templates and then a post-change layout image is displayed. Accordingly, the user needs to specify manually the post-change layout image and a desired (highly satisfactory) template to be used for the post-change layout image. That is, the technique described in Japanese Patent No. 5449460 has an issue that it is difficult for the user to specify a highly satisfactory layout image as post-change layout image and a highly satisfactory template as template to be used for the post-change layout image.

SUMMARY

In light of the foregoing issue, the present disclosure generally makes it easy for the user to specify a highly satisfactory layout image as post-change layout image and a highly satisfactory template as template to be used for the post-change layout image.

According to one or more aspects of the present disclosure, a control method is characterized, among other features, in causing a computer in an image processing apparatus to execute:

displaying on a display unit a pre-change layout image in which an arrangement image is arranged in a template;

accepting a change instruction for displaying a post-change layout image different at least partly from the pre-change layout image on the display unit; and executing, in a case that the change instruction is accepted, at least a process for displaying a first post-change layout image on the display unit with a priority over a second post-change layout image with a higher degree of similarity to the pre-change layout image than the first post-change layout image or a process for displaying the first post-change layout image on the display unit in a more emphasized manner than the second post-change layout image.

In addition, a control method according to the present disclosure may be characterized in causing a computer in an image processing apparatus to execute:

displaying on a display unit a pre-change layout image in which an arrangement image is arranged in a template;

accepting a change instruction for displaying a post-change layout image different at least partly from the pre-change layout image on the display unit; and executing, in a case that the change instruction is accepted, at least a process for displaying a first post-change template on the display unit with a priority over a second post-change template with a higher degree of similarity to a template used for the pre-change layout image than the first post-change template or a process for displaying the first post-change template on the display unit in a more emphasized manner than the second post-change template.

Further features of the present disclosure will become apparent from the following description of exemplary embodiments (with reference to the attached drawings).

BRIEF DESCRIPTION OF THE DRAWINGS

FIG. 5 is a diagram illustrating a table for management of image analysis information of image data.

FIG. 7 is a diagram for describing classification of scenes.

FIGS. 8A and 8B are diagrams for describing scoring of a main slot and a sub slot.

FIGS. 9A to 9I are diagrams for describing selection of image data.

FIGS. 13A and 13B are diagrams that illustrate tables showing values related to the degree of similarities between templates.

DESCRIPTION OF THE EMBODIMENTS

Various exemplary embodiments, features, and aspects of the present disclosure will be described below in detail with reference to the accompanying drawings. The following embodiments are not intended to limit the present disclosure according to the claims. In addition, all the combinations of characteristics described in relation to the embodiments are not necessarily essential to the solution of the present disclosure. Identical constituent elements will be given identical reference numbers and descriptions thereof will be omitted.

In the following embodiments, an application program for creation of an album (photo book) (hereinafter, called "album creation application") is operated on an image processing apparatus to generate an automatic layout as described below. Images described below include, unless otherwise specified, still images, moving images, frame images in moving images, and still images, moving images, and frame images in moving images in social networking service (SNS) servers.

First Embodiment

In the present embodiment, an album creation application is operated on an image processing apparatus to generate a layout by an automatic layout function as described below.

Figure 14:
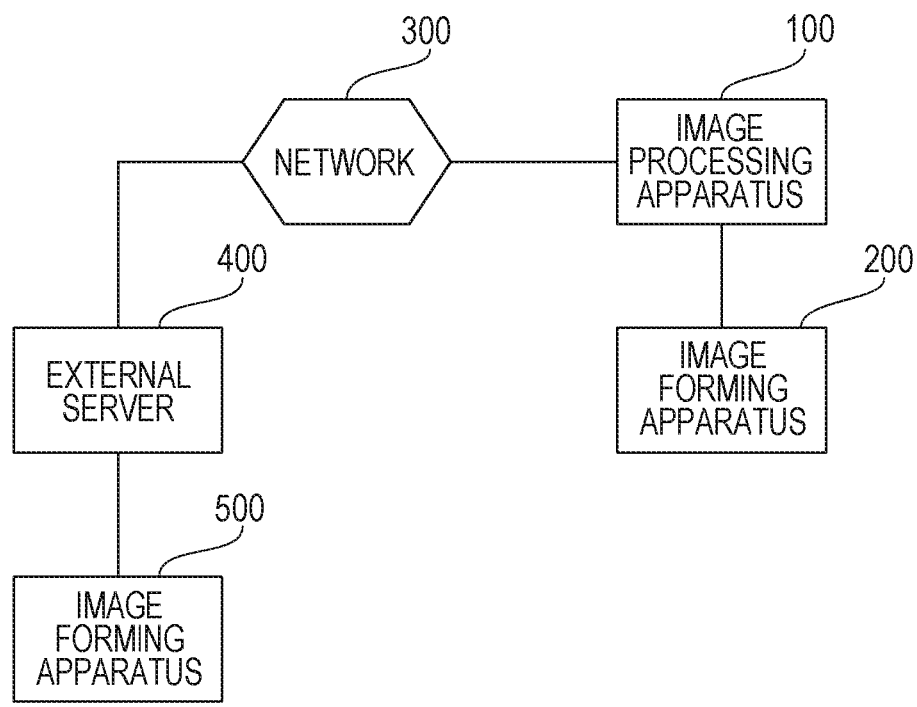
FIG. 14 is a diagram illustrating a configuration of a print system.

An example of a print system according to the present embodiment will be described with reference to FIG. 14. The print system includes an image processing apparatus 100, an image forming apparatus 200, a network 300, an external server 400, and an image forming apparatus 500.

The image forming apparatus 200 executes an image forming process (print process) to form an image on a print medium by a recording material based on a print job received from the image processing apparatus 100 or the like. In the present embodiment, the image processing apparatus 100 transmits (outputs) generated layout information to an external server. However, for example, the image processing apparatus 100 may be configured to transmit the generated layout information as a print job to the image forming apparatus 200. In this case, the image forming apparatus 200 creates the album based on the layout information.

The network 300 connects to the image processing apparatus 100 and the external server 400 and constitutes a communication network for transmission of information between the two. The network 300 may be a wired network or a wireless network.

The external server 400 accepts layout information described later from the image processing apparatus 100 via the network 300. That is, the external server 400 is a server that accepts orders of albums and manages the albums. When the user of the image processing apparatus 100 performs an album purchase procedure, the external server 400 causes the image forming apparatus 500 to create an album by an image forming process based on the accepted layout information. After that, the album created by the image forming apparatus 500 is delivered to the user who has performed the album purchase procedure.

Figure 1:
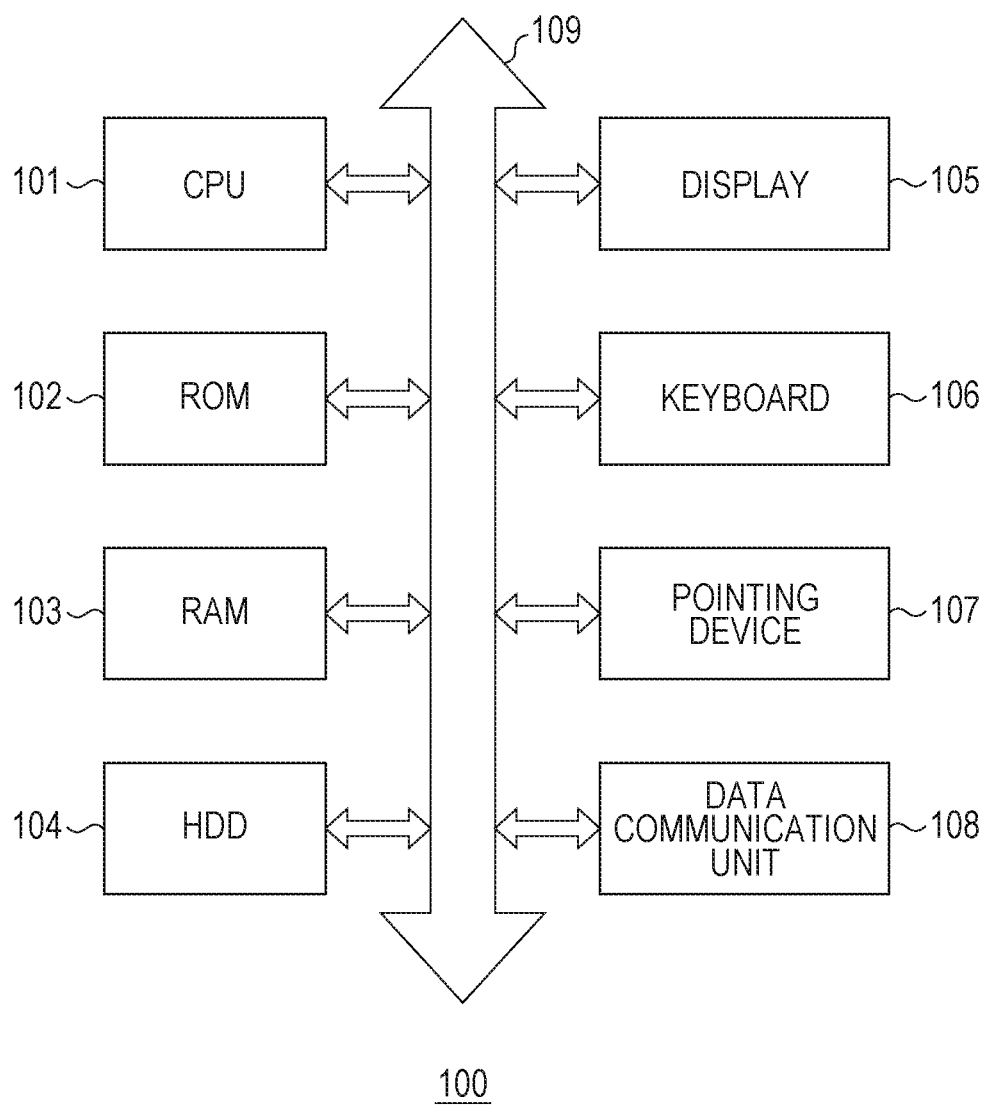
FIG. 1 is a block diagram of a hardware configuration of an image processing apparatus.

FIG. 1 is a block diagram of a hardware configuration of an image processing apparatus. Examples of the image processing apparatus may include personal computer (PC), smartphone, tablet terminal, camera, printer, or the like. In the present embodiment, the image processing apparatus is a PC. A central processing unit (CPU/processor) 101, which may include one or more processors, one or more memories, circuitry, or a combination thereof, may perform centralized control of the image processing apparatus 100, and may implement the operations in the present embodiment by reading programs from a ROM 102 into a RAM 103 and executing the same, for example. FIG. 1 illustrates one CPU but a plurality of CPUs may be provided. The ROM 102 is a general-purpose ROM that stores the programs to be executed by the CPU 101, for example. The RAM 103 is a general-purpose RAM that is used as a working memory for storing temporally various kinds of information at the time of execution of the programs by the CPU 101, for example. The hard disc drive (HDD) 104 is a storage medium (storage unit) for storing a database holding image files and results of processing such as image analysis and templates to be used by the album creation application.

A display device 105 displays to the user the results of layout of user interfaces (UIs) and images in the present embodiment. A keyboard 106 and a pointing device 107 accept instructions from the user. The display device 105 may include a touch sensor function. The keyboard 106 is used by the user to input the number of double-page spreads of an album to be created on the UI displayed on the display device 105, for example. The pointing device 107 is used by the user to click a button on the UI displayed on the display device 105, for example.

A data communication unit 108 conducts communications with external devices via wired or wireless networks. The data communication unit 108 transmits layout data generated by the automatic layout function to printers and servers communicable with the image processing apparatus 100, for example. A data bus 109 connects between the blocks illustrated in FIG. 1 in a mutually communicable manner.

The album creation application in the present embodiment is saved in an HDD 104 and is activated by the user double-clicking the icon for the application on the display device 105 by the pointing device 107 as described later. In addition, the album creation application is installed from an external server via the data communication unit 108 and saved in the HDD 104, for example.

<Automatic Album Layout>

Figure 2:
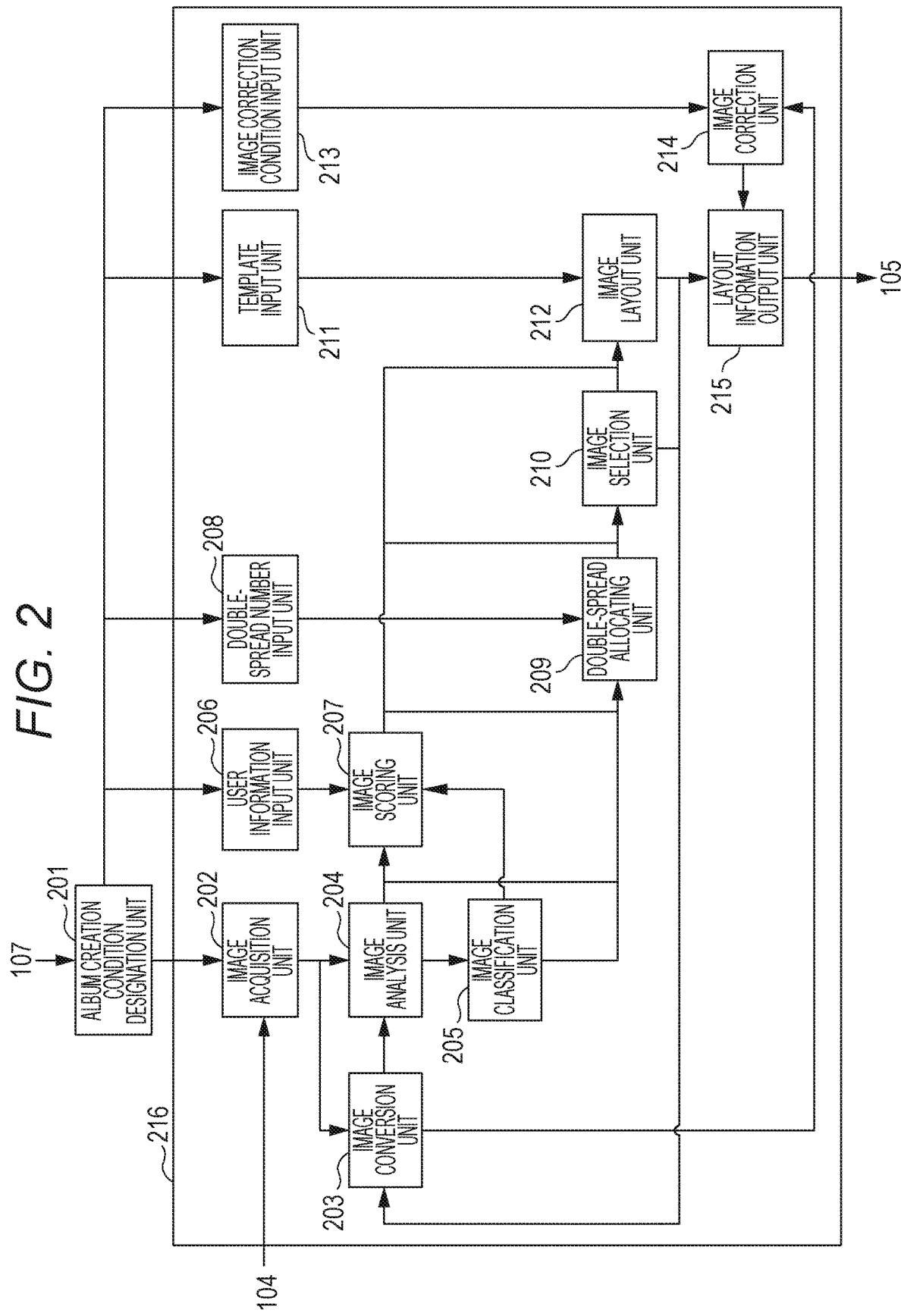
FIG. 2 is a software block diagram of an album creation application.

FIG. 2 is a software block diagram of the album creation application. FIG. 2 illustrates software blocks relating to an automatic layout processing unit that executes the automatic layout function. The automatic layout function is a function to lay out image data classified and selected from taken still images and moving images based on their contents and attributes in a prepared template and display the same on the display device 105.

Figure 3:
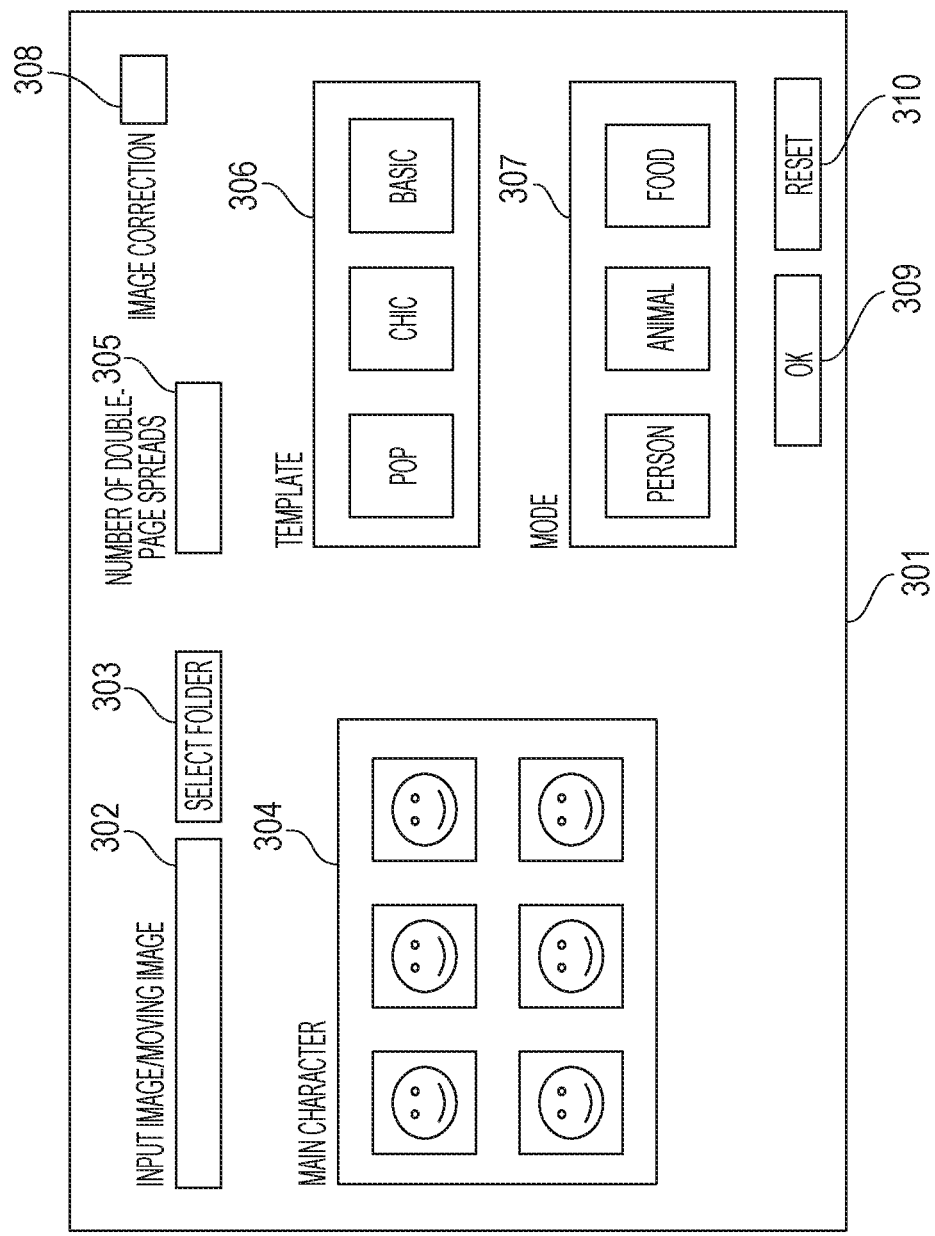
FIG. 3 is a diagram illustrating a display screen provided by the album creation application.

An album creation condition designation unit 201 accepts designation of album creation conditions according to an UI operation described later by the pointing device 107 and outputs the same to the automatic layout processing unit, for example. The designated conditions include the IDs for image data and main character to be processed, the number of double-page spreads of the album, template information, ON/OFF state for image correction, ON/OFF state for the use of moving images, designation of an album mode, and others, for example. The double-page spread refers to a pair of adjacent pages that is printed on different sheets (or pages). In the album creation application in the present embodiment, a layout of one double-page spread is created in one display window. The album creation condition designation unit 201 displays a setting screen as illustrated in FIG. 3, for example, and accepts an input into the screen to accept designation of album creation conditions.

An image acquisition unit 202 acquires an image group (image data group) designated by the album creation condition designation unit 201 from a storage area such as the HDD 104. The image acquisition unit 202 may acquire the image group from a storage area such as a server or an SNS server on networks via the data communication unit 108. The image group here refers to candidates for image data for use in creation of an album. For example, the album creation condition designation unit 201 may designate January 1, XX to December 31, XX, as a condition regarding the date and time when the image data as a layout target was generated (the pictures corresponding to the image data were taken) (hereinafter, called shooting date and time), for example. In this case, the image acquisition unit 202 acquires all image data generated on January 1, XX to December 31, XX, as an image group.

The image data stored in the storage area may include, for example, still image data and clipped image data acquired by clipping frames out of moving images. The still image data and the clipped image data are acquired from imaging devices. The imaging devices may be included in the image processing apparatus 100 or may be included in external devices (PC, smart phone, digital camera, tablet terminal, or the like) as devices outside the image processing apparatus 100. In the case of acquiring image data from an external device, the image processing apparatus 100 acquires the image data via the data communication unit 108. The image processing apparatus 100 may acquire the still image data and the clipped image data from a network or a server via the data communication unit 108. The CPU 101 analyzes data accompanying the image data to determine where the individual image data was acquired.

An image conversion unit 203 converts pixel count information and color information of the image data acquired by the image acquisition unit 202. The pixel count information and color information to be converted into the image data by the image conversion unit 203 are decided in advance, and the information is saved in the album creation application or a parameter file to be used in the album creation application. In the present embodiment, the image data acquired by the image acquisition unit 202 is converted into image data in which the pixel count is 420 on a short side and the color information is sRGB.

An image analysis unit 204 analyzes image data. In the present embodiment, the image analysis unit 204 analyzes the image data already converted by the image conversion unit 203. Specifically, the image analysis unit 204 acquires feature amounts from the converted image data, and executes object detection, face detection, recognition of facial expressions from detected faces, personal recognition of the detected faces in the converted image data. Further, the image analysis unit 204 acquires shooting date/time information from data (for example, Exif information) accompanying the image data before conversion acquired by the image acquisition unit 202. The shooting date/time information is not limited to the Exif information but may be information on the date and time when the image data was generated or updated. Alternatively, the shooting date/time information may be information on the date and time when the image data was uploaded to a local server or an SNS server or the image data was downloaded from a local server or an SNS server. The foregoing date/time information is also treated as shooting date/time information in the following description. The local server is a storage area included in the image processing apparatus 100 such as the HDD 104.

An image classification unit 205 executes scene segmentation and scene classification described later on an image data group by using object detection result information such as the shooting date/time information, the number of images, and the detected face information. The scenes include shooting scenes such as "travel", "daily life", and "wedding ceremony". Each of the scenes can also be called a collection of image data generated on one shooting occasion, for example.

An image scoring unit 207 gives a score to each of the image data such that the image data suitable for a layout receive high scores. The image scoring unit 207 conducts scoring according to the information obtained by the image analysis unit 204 and the information obtained by the image classification unit 205. Other information may be used additionally or alternatively. In the present embodiment, the image scoring unit 207 gives a score to each of the image data such that the image data including a main character ID input from a main character information unit receive high scores.

A user information input unit 206 inputs ID (identification information) of a main character designated by the album creation condition designation unit 201 into the image scoring unit 207. The image scoring unit 207 is configured to add higher scores to the image data including the main character ID input by the user information input unit 206.

The user information input unit 206 also inputs a priority mode designated by the album creation condition designation unit 201 into the image scoring unit 207. The image scoring unit 207 is configured to add higher scores to the image data including one or more objects input by the user information input unit 206.

A double-page spread number input unit 208 inputs the number of double-page spreads of an album designated by the album creation condition designation unit 201 into a double-page spread allocating unit 209.

The double-page spread allocating unit 209 segments an image group (grouping) and allocates the segmented parts to the double-page spreads. The double-page spread allocating unit 209 segments the image group according to the input number of double-page spreads and allocates parts of the image group to the double-page spreads.

An image selection unit 210 selects image data representing arrangement images to be arranged in a template from the image group allocated to the double-page spreads by the double-page spread allocating unit 209, based on the scores given by the image scoring unit 207.

A template input unit 211 reads a plurality of templates according to the template information designated by the album creation condition designation unit 201 from the HDD 104 and inputs the templates into an image layout unit 212. In the present embodiment, the plurality of templates is saved in the album creation application in the HDD 104. The plurality of templates includes, for example, information on the sizes of the entire templates and information on the numbers, sizes, and positions of slots included in the templates.

An image layout unit 212 decides the layout of a double-page spread. Specifically, the image layout unit 212 selects a template suitable for the image data selected by the image selection unit 210 from the plurality of templates input by the template input unit 211, and decides the arrangement positions of the images. Accordingly, the layout of the double-page spread is decided.

A layout information output unit 215 outputs layout information for displaying the layout image on the display device 105 according to the layout decided by the image layout unit 212. The layout image is, for example, an image in which the arrangement images represented by the image data selected by the image selection unit 210 are arranged in the selected template. The layout information is bitmap data indicating the images.

An image correction unit 214 executes correction processing such as dodging correction (brightness correction), red-eye correction, and contrast correction. A correction condition input unit 213 inputs ON/OFF state of image correction designated by the album creation condition designation unit 201 into the image correction unit 214.

The image data output from the layout information output unit 215 is displayed on the display device 105 in a format as illustrated in FIG. 3, for example.

When the album creation application according to the present embodiment is installed into the image processing apparatus 100, the OS running on the image processing apparatus 100 generates a starting icon on a top screen (desktop) displayed on the display device 105. When the user double-clicks on the start icon with the pointing device 107, the program for the album creation application saved in the HDD 104 is loaded into the RAM 103. The program loaded into the RAM 103 is executed by the CPU 101 to start the album creation application. The program may be stored in the ROM 102.

FIG. 3 is a diagram illustrating an example of a UI configuration screen 301 provided by the started album creation application. The UI configuration screen 301 is displayed on the display device 105. When the user sets album creation conditions described later via the UI configuration screen 301, the album creation condition designation unit 201 acquires the setting contents designated by the user. A path box 302 on the UI configuration screen 301 indicates the saving place (path) of an image/moving image group to be a target of album creation in the HDD 104. A folder selection button 303 is clicked by the user with the pointing device 107 to display folders including the image/moving image group to be a target of album creation in a tree structure in a user-selectable manner. Then, the folder path including the image/moving image group selected by the user is displayed in the path box 302.

Main character designating icons 304 are icons for the user to designate the main character, and have persons' facial images displayed as icons. The person corresponding to the icon selected by the user is set as the main character of the album to be created. The main character designating icons 304 are also used to specify the main character as a central figure from persons seen in the images represented by the image data to be analyzed. The main character designating icons 304 are the facial images of persons selected by the user or decided by a method described later from the facial images of persons registered with a face database, for example. The main character may be automatically set according to the procedure illustrated in FIG. 4.

A double-page spread number box 305 accepts the setting for the number of double-page spreads of the album from the user. The user inputs a figure via the keyboard 106 directly into the double-page spread number box 305 or inputs a figure from a list with the pointing device 107 into the double-page spread number box.

Template designating icons 306 are illustration images according to the tastes of templates (pop, chic, and others). The template according to the icon selected by the user is set as the template for use in the album to be created. In the present embodiment, each of the templates has image arrangement frames (slots) for arrangement of the image data. The image data is embedded into the slots in the template to complete one layout image.

A mode designation unit 307 has icons corresponding to the modes of the album to be created. The mode of an album refers to the mode for laying out images including a predetermined object in a template on a priority basis. An album in each mode has more images of the object according to the mode. In the present embodiment, there may be three modes including, for example, "person", "animal", and "food". The mode of an album can also be called the theme of the album, for example. When the "animal" mode is selected for an album, for example, the images including animals are laid out in a template on a priority basis. In addition, there may be a mode for laying out image data representing images of objects other than the foregoing three in the template on a priority basis. A plurality of modes may be selected at the same time. In that case, images of one or more of the plurality of objects corresponding to the plurality of selected modes may be laid out in the template on a priority basis. Then, the mode corresponding to the selected icon is set as the mode of the album to be created.

The modes of the album are not limited to the foregoing three but may be any other modes such as "building", "vehicle", "flower", etc., for example.

A checkbox 308 accepts the ON/OFF setting of image correction from the user. An OK button 309 is a button for accepting the confirmation of completion of the setting from the user. When the user presses the OK button 309, the album creation condition designation unit 201 outputs the setting information on the screen 301 to modules of the automatic layout processing unit corresponding to the setting information.

A reset button 310 is a button for resetting the setting information on the UI configuration screen 301.

Settings other than the foregoing settings may be made on the UI configuration screen 301. For example, the settings on moving images and the settings on the destination of acquisition of image/moving image data may be made.

A server name box indicates the name of a server or an SNS including the image group for use in the creation of the album. When a login to a designated server or SNS is completed by the user via a login screen, the CPU 101 can acquire image data from the designated server or SNS.

A moving image use checkbox accepts from the user the setting on whether the moving image in the folder designated in the path box 302 or the server or SNS designated in the server name box is to be used in the creation of the album.

A target period box accepts from the user the setting on the conditions for the shooting date and time of the image group or the moving image group as a target of the album creation.

Figure 4:
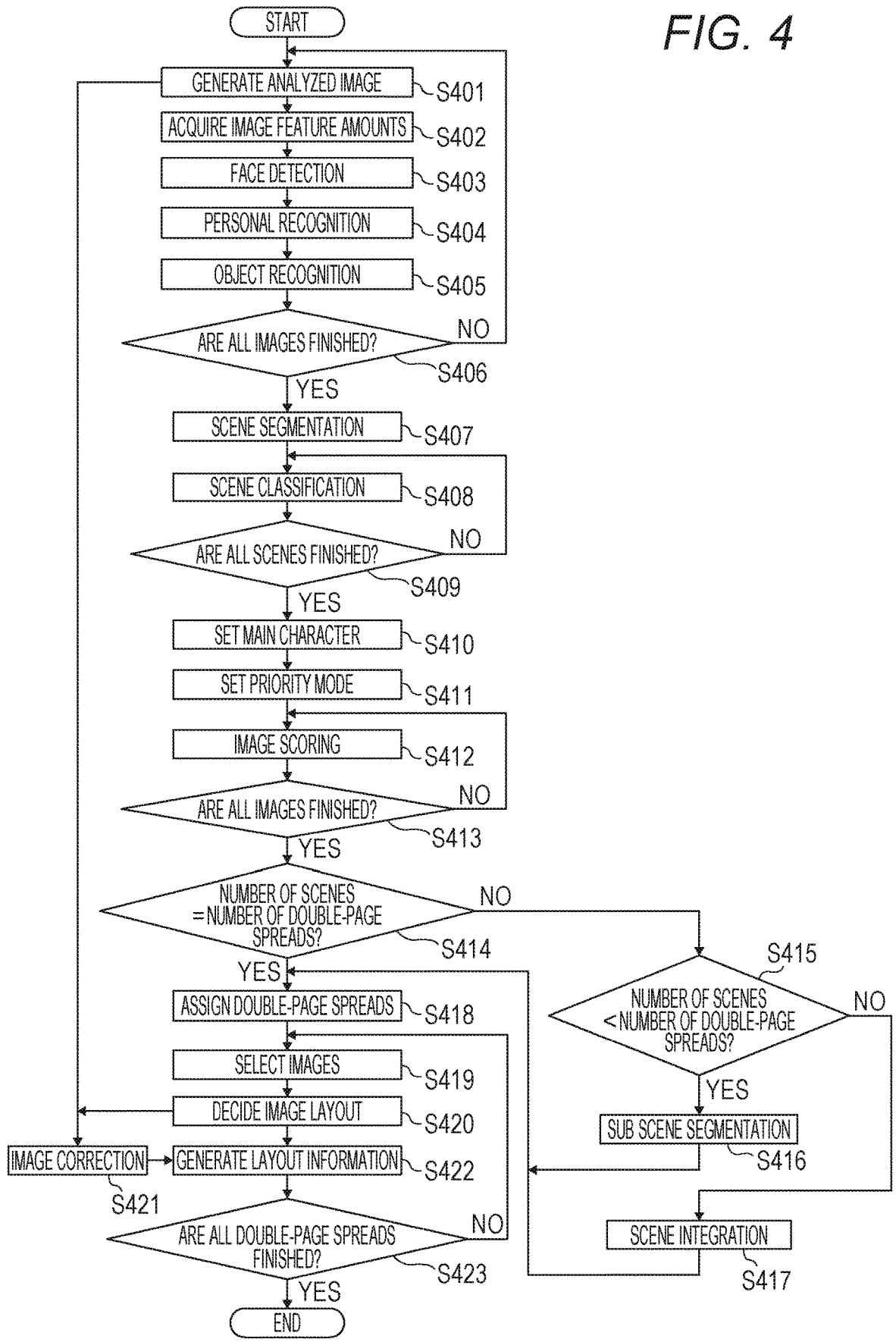
FIG. 4 is a flowchart of an automatic layout process.

FIG. 4 is a flowchart of a process by the automatic layout processing unit in the album creation application. The process in the flowchart illustrated in FIG. 4 is implemented by the CPU 101 reading a program from the HDD 104 into the ROM 102 or the RAM 103 and executing the same, for example. The automatic layout process will be described with reference to FIG. 4.

In S401, the CPU 101 subjects the image data acquired by the image acquisition unit 202 to analysis by the image conversion unit 203 to generate analyzed image data. Specifically, the CPU 101 converts by the image conversion unit 203 the image data in the image data group in the HDD 104 designated by the album creation condition designation unit 201 into the analyzed image data with a desired number of pixels and color information. The image data acquired by the image acquisition unit 202 is data corresponding to the still images or moving images acquired by the CPU 101 from the folder, server, or SNS designated in the path box 302 by the image acquisition unit 202.

In S402, the CPU 101 acquires feature amounts from the analyzed image data (the image data acquired and analyzed in S401) by the image analysis unit 204. For example, the CPU 101 acquires the shooting date and time from the Exif information accompanying the image data acquired from the HDD 104. The feature amount is focus, for example.

In S403, the CPU 101 executes face detection on the analyzed image data generated in S401 by the image analysis unit 204. The CPU 101 extracts a facial image and acquires the upper left coordinate value and lower right coordinate value of the detected facial image. With these two kinds of coordinates, the CPU 101 can acquire the position of the facial image and the size of the facial image. In this case, a strong discriminator may be generated by Adaboost to detect objects other than faces, including animals such as dog and cat, flowers, food, buildings, and stationary articles. Accordingly, the CPU 101 can detect objects other than facial images.

In S404, the CPU 101 performs personal recognition by the image analysis unit 204. The CPU 101 determines the degree of similarity between each of representative facial images and the extracted facial image, and sets the ID of the representative facial image with the highest degree of similarity equal to or greater than a threshold as the ID of the detected facial image. When the degrees of similarity to all the representative facial images saved in a face dictionary database are lower than the threshold, the CPU 101 registers the extracted facial image with a new personal ID in the face dictionary database.

In S405, the CPU 101 executes an object recognition process on the analyzed image data generated in S401 by the image analysis unit 204 to recognize objects in the images represented by the image data. The object recognition process can be performed by a publicly known method. In the present embodiment, objects are recognized by a discriminator generated by DeepLearning. The image analysis unit 204 recognizes object images to acquire the types of objects including pets such as dog and cat, flowers, food, buildings, and stationary articles.

The CPU 101 differentiates between the image analysis information acquired in S402 to S405 by ID for identifying each of the images as illustrated in FIG. 5, and stores the same in a storage area such as the ROM 102. For example, as illustrated in FIG. 5, the shooting date/time information and focus determination results acquired in S402 and the number and position information of the facial images detected in S403, and the objects detected in S405 are stored in a table format. The position information of the facial images is stored in distinction from one another by the personal ID acquired in S404.

In S406, the CPU 101 determines whether S401 to S405 are completed on all the image data in the image data group in the HDD 104 designated by the album creation condition designation unit 201. When not determining that S401 and S405 are completed, the CPU 101 repeats S401 and the subsequent steps. When determining that S401 and S405 are completed, the CPU 101 moves the process to S407.

In S407, the CPU 101 executes scene segmentation by the image classification unit 205. The scene segmentation refers to segmenting all the images in the image group designated by the album creation condition designation unit 201 for each of the scenes and managing the same as a plurality of image groups. In the following description, the image groups obtained by segmenting all the image data (main image group) will be called sub image groups.

Figure 6A:
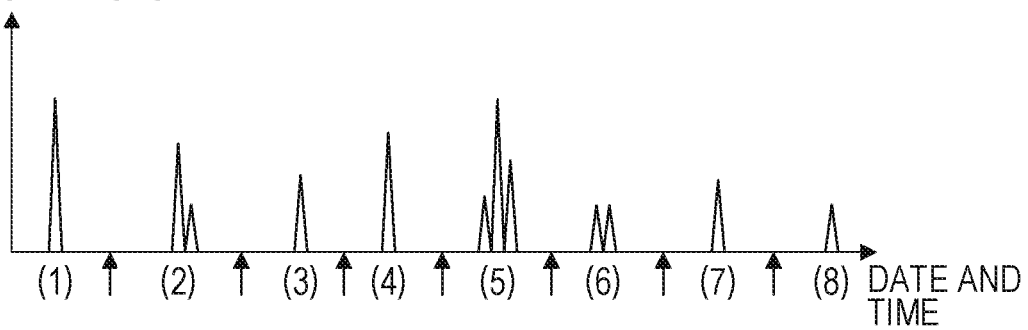
FIGS. 6A to 6C are diagrams for describing segmentation of image data groups.
Figure 6B:
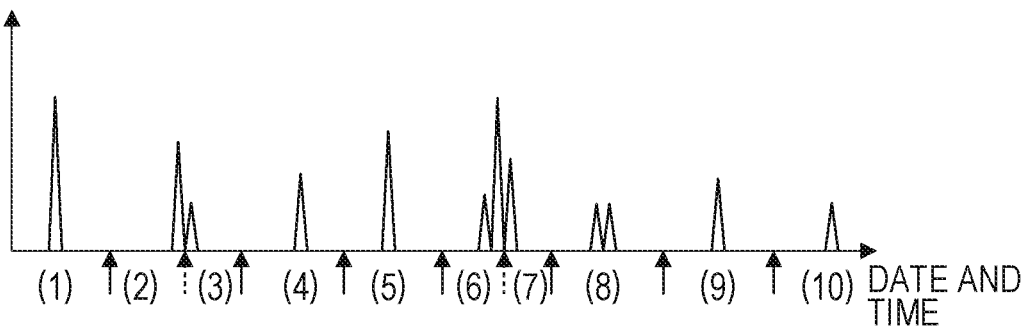
Figure 6C:
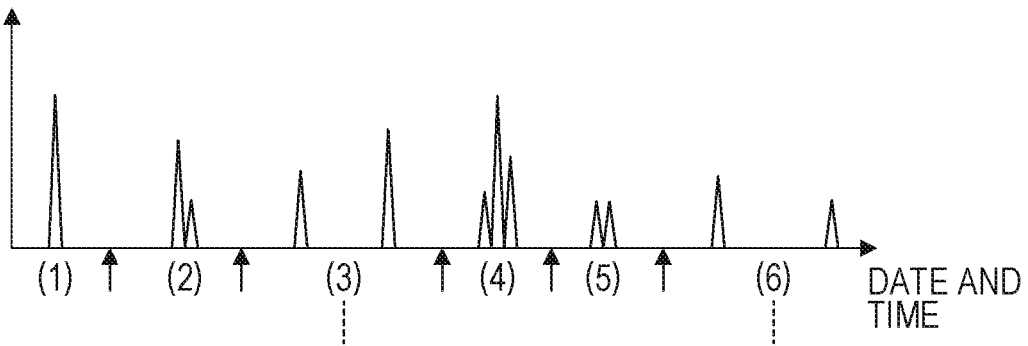

FIG. 6A illustrates an example of grouping of the captured image data. In FIGS. 6A to 6C, the lateral axis indicates the shooting date and time (older toward the left side and newer toward the right side), and the vertical axis indicates the number of the captured image data. In the case of FIG. 6A, the captured image data group is segmented into eight sub image groups 601 to 608. In FIG. 6A, the arrows indicate the boundaries between the groups.

In S408, the CPU 101 executes scene classification by the image classification unit 205. Specifically, the CPU 101 gives scores to the segmented image groups having undergone scene segmentation in S407 by the type of scene and classifies the segmented image groups to the scene with the highest score. In the following description, the scoring in S408 will be called scene classification and scoring. In the present embodiment, the image classification unit 205 classifies the image data having undergone the scene segmentation to any of scenes "travel", "daily life", and "ceremony", for example. Before the start of the automatic layout processing unit as illustrated in FIG. 4, the user collects and designates a plurality of image data judged as being in the scene of "travel", "daily life", or "ceremony" to generate a scene classification table. The scene classification table is a table storing the information on the feature amounts corresponding to the types of the scenes, which is used for the scene classification and scoring.

In the present embodiment, a table 700 illustrated in FIG. 7 is used as the scene classification table. The table 700 stores the average values and standard deviations of shooting period 702, shot image number 703, and shot person number 704 in association with scene IDs 701.

In S409, the CPU 101 determines whether the scene classification in S408 is completed on all the segmented image data groups obtained in S407 (here, the segmented image data groups corresponding to the segmented scenes illustrated in FIG. 6A). When not determining that the scene classification is completed, the CPU 101 repeats S408 and the subsequent steps on the new segmented image data groups yet to be processed. When determining that the scene classification is completed, the CPU 101 moves the process to S410.

In S410, the CPU 101 executes main character setting by the image scoring unit 207. The main character setting is made on the image data group designated by the user by either of two automatic and manual setting methods.

In S411, the CPU 101 executes priority mode setting by the image scoring unit 207. In the present embodiment, an album is created in any of modes. The modes for use in the album creation include a plurality of modes corresponding to the types of objects (for example, "person" mode, "animal" mode, and others). The priority mode setting is a process for setting the mode to be used. The mode of the album may be set manually by the user or may be set automatically based on the characteristics of the image data acquired by the image acquisition unit 202.

In S412, the CPU 101 executes image scoring by the image scoring unit 207. The image scoring means giving scores to the image data from a viewpoint of estimation described later, which is referred to at the time of selection of image data for use in layout described later.

Figure 10:
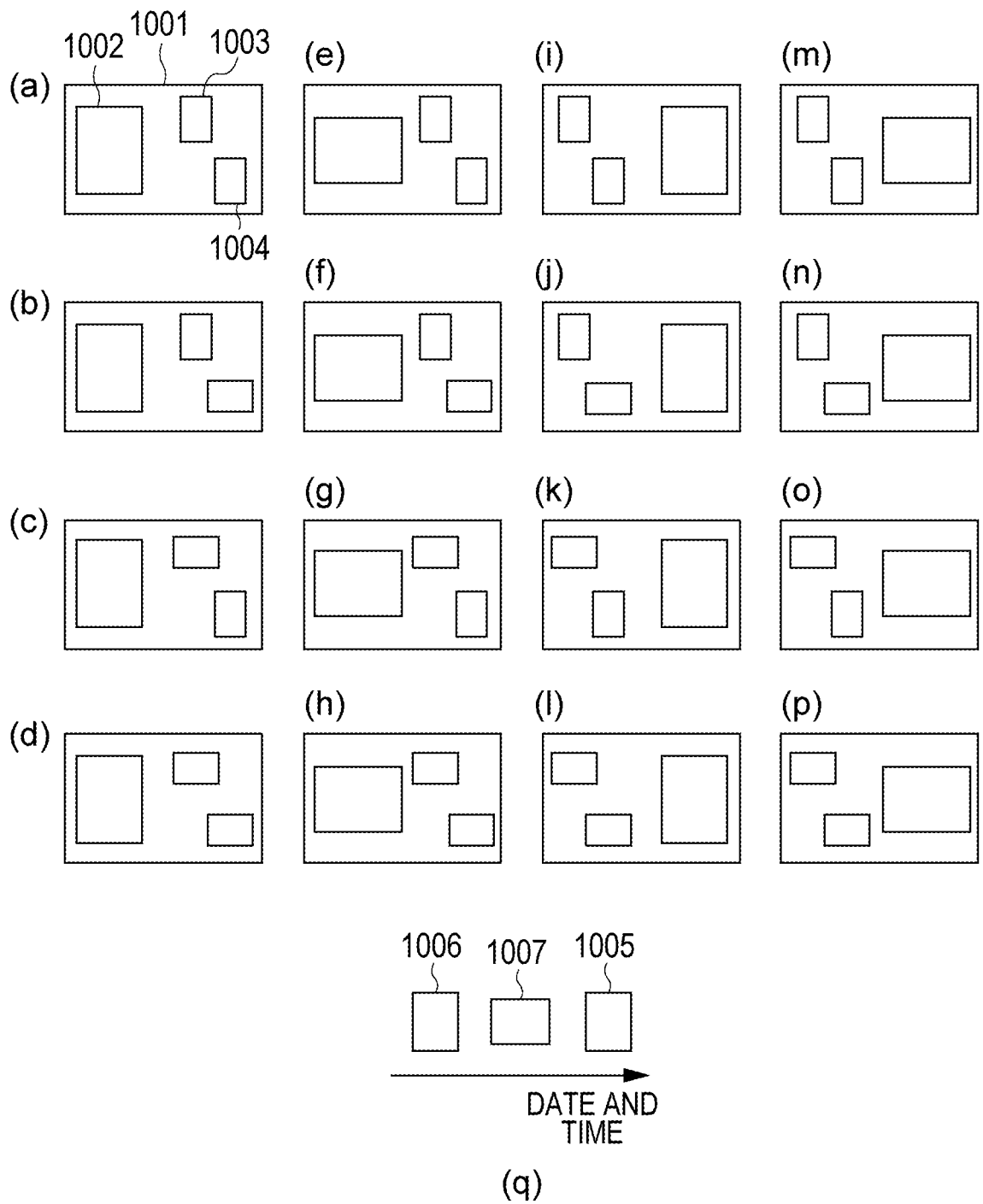
FIG. 10 is a diagram illustrating template groups for use in generation of a layout image.

FIG. 10 is a diagram illustrating a template group for use in layout of the image data. The plurality of templates included in the template group corresponds to double-page spreads. A template 1001 is one template. A main slot 1002 constitutes a main slot, and sub slots 1003 and 1004 constitute sub slots. The main slot 1002 is the main slot (frame where images are to be laid out (arranged)) in the template 1001, which is larger in size than the sub slots 1003 and 1004. In one template, image data classified into the same type of scene are laid out. In S410, the CPU 101 performs the image scoring process to give both a score for the main slot and a score for the sub slots corresponding to the scene of the type of the image data.

In the image scoring, a slot feature table is used. The slot feature table stores the information on the feature amounts of the images to be used in the main slot and the sub slots by the type of the scene. FIG. 8A is a diagram illustrating the characteristics of the image data to be used in the main slot and the sub slots in the templates corresponding to the scenes of the types "travel", "daily life", and "ceremony". Accordingly, scoring for both the main slot and the sub slots is executed on the image data.

In the present embodiment, the CPU 101 further adds scores to the scores calculated as described above based on the mode designated by the album creation condition designation unit 201.

The CPU 101 performs image scoring on each of the image data in the image data group designated by the user. The scores added by the image scoring constitute a criteria for selection in an image selection process in subsequent step S423. Accordingly, in the image selection process described later, the CPU 101 selects image data representing the images including objects in the category corresponding to the mode of the album set in S411 with a priority over the image data representing the images not including the objects.

FIG. 8B illustrates an example of scoring results by the layout scoring. For example, an image ID1 is given a score of 20 for the main slot, and an image ID2 is given a score of 45 for the main slot. This means that, out of the images for the main slot, the image ID2 is closer to the criteria for the user's judgment.

In S413, the CPU 101 determines whether the layout scoring by the image scoring unit 207 is completed on all the image data in the image data group designated by the user. When not determining that the layout scoring is completed, the CPU 101 repeats S413 and the subsequent steps on the subsequent unprocessed images. When determining that the layout scoring is completed, the CPU 101 proceeds to S414.

In the present embodiment, the CPU 101 lays out the image data included in the plurality of scenes, in the plurality of templates corresponding to the plurality of scenes (the plurality of double-page spreads) by the image layout unit 212. Accordingly, it is necessary that there is a match between the number of scenes and the number of templates (the predetermined number of double-page spreads).

In S414, the CPU 101 determines by the double-page spread allocating unit 209 whether the number of segments obtained by the scene segmentation is the same as the number of double-page spreads of the album input by the double-page spread number input unit 208 in S407. When not determining that the numbers are the same, the CPU 101 proceeds to S415, and when determining that the numbers are the same, the CPU 101 proceeds to S418.

In S415, the CPU 101 determines by the double-page spread allocating unit 209 whether the number of segments obtained by the scene segmentation in S406 is smaller than the number of double-page spreads (the number of templates for use in the album) input by the double-page spread number input unit 208. When determining that the number of segments is not smaller (larger), the CPU 101 proceeds to S417, and when determining that the number of segments is smaller, the CPU 101 proceeds to S416. For example, when the number of scene segments is eight and the number input by the double-page spread number input unit 208 is ten as illustrated in FIG. 6A, the CPU 101 proceeds to S416.

In S416, the CPU 101 executes sub scene segmentation by the double-page spread allocating unit 209. The sub scene segmentation means sub-segmentation of the segmented scenes in the case where the number of scene segments is smaller than the number of double-page spreads of the album. Descriptions will be given as to the case where the number of scene segments is eight and the designated number of double-page spreads of the album is ten as illustrated in FIG. 6A. FIG. 6B illustrates the results of sub scene segmentation of the scenes illustrated in FIG. 6A. In this case, the segmentation intervals may be shortened so that segmentation is made at points shown by dashed arrows and thus the number of segments becomes ten.

The standard for segmentation will be described. Among the segments illustrated in FIG. 6A, segments with a large number of image data are searched for. In this case, two points with a large number of image data are determined to increase the number of segments by two from eight to ten. That is, the scenes to be sub-segmented are designated in order from the scene corresponding to the segmented image data group including the largest number of image data. For the scenes corresponding to the segmented image data groups with the same number of image data, the scene with the larger maximum value of the difference in shooting date and time between the image data included in the corresponding segmented image data group is selected. Still if the selection is not possible, the scene corresponding to the segmented image data group including the image data generated earlier may be sub-segmented on a priority basis, for example.

Referring to FIG. 6A, the scenes with a large number of image data included in the corresponding segmented image data group are scene 5, scene 1, and scene 2 in descending order. Scenes 1 and 2 have the same number of data, but scene 2 is set as segmentation target because scene 2 has a larger time difference between the first-generated image data and the last-generated image data in the corresponding segmented image data group. That is, in the case of FIG. 6A, scenes 5 and 2 are segmented.

First, the segmentation of scene 2 will be described. Scene 2 has two peaks of image data, and the image data included in the two peaks are different in shooting date. Accordingly, scene 2 is segmented at a point shown by a dashed arrow illustrated in FIG. 6B corresponding to the part where the shooting date is changed. Next, the segmentation of scene 5 will be described. Scene 5 has three peaks of image data, and the image data included in the three peaks are different in shooting date as in the case of scene 2. Scene 5 has two points where the shooting date is changed. In this case, however, scene 5 is segmented by shooting date such that differences in the number of data after the segmentation become small. That is, scene 5 is segmented at a point shown by a dashed arrow illustrated in FIG. 6B. In such a manner as described above, the number of segments, that is, the number of scenes is changed from eight to ten. Specifically, the scene sub-segmentation is performed such that, when the selected scene includes image data different in shooting date, the image data groups different in shooting date are new scenes. When the shooting extends across three or more days, scene segmentation is performed such that the differences in the number of image data between the segmented scenes become minimum and the images of the same shooting date are included in the same scene. An example of segmentation at the point different in shooting date has been described so far. However, when the shooting date of the image data in the scene to be segmented is a single day, the segmentation is made at a point where the time difference in the shooting hour in the single day becomes maximum. In addition, in this example, the segmentation is made at the point where the shooting date is changed. However, when there are points with a large number of image data in a single day, the segmentation may be made at a point with the maximum time difference in the single day. According to the procedure described above, the number of scenes is made identical to the number of double-page spreads. The scenes generated by the segmentation may be anew classified or may take over the classification before the segmentation.

In S417, the CPU 101 executes scene integration by the double-page spread allocating unit 209. The scene integration means that, in the case where the number of scene segments is larger than the number of double-page spreads of the album, the segmented scenes are integrated. Descriptions will be given as to the case where the number of scene segments is eight and the designated number of double-page spreads is six as illustrated in FIG. 6A as an example. FIG. 6C illustrates the result of scene integration from FIG. 6A. The scenes before and after the points shown by broken lines are integrated to change the number of segments to six.

The criteria for integration will be described. First, the CPU 101 detects scenes with a small number of image data from the segmented scenes. In this example, two scenes with a small number of image data are detected to decrease the number of scenes from eight to six. Referring to FIG. 6A, the scenes with a large number of scenes included in the corresponding segmented image data group are scene 8, scene 3, and scene 7 in ascending order. Scene 3 and scene 7 are the same in the number of image data.

Next, the CPU 101 sets scene 8 with the smallest number of image data included in the corresponding segmented image data group as a target of integration. Scene 3 and scene 7 are the same in the number of image data included in the corresponding segmented image data group, and thus the CPU 101 selects either one of them as a target of integration. In this example, since scene 8 adjacent to scene 7 is a target of integration (scene 7 and scene 8 are to be integrated), the CPU 101 sets scene 3 as a target of integration.

Next, the CPU 101 decides whether the sub image data groups as a target of integration are to be integrated into the scene earlier in the shooting date and time of the image data or later in the shooting date and time of the image data included in the corresponding segmented image data group. At this time, the CPU 101 sets, out of the two scenes adjacent to the scene as a target of integration, the scene with a smaller time difference in the shooting date and time of the image data included in the corresponding segmented image data group as the target of integration. Accordingly, in the example of FIG. 6A, scene 2 or 4 adjacent to scene 3 is set as the target of integration with scene 3. In comparison between scene 3 and each of scenes 2 and 4 in the time differences in the shooting date and time between the images included in the corresponding segmented image data group, the time difference between scene 3 and scene 4 is smaller. Accordingly, the CPU 101 decides integration of scene 3 with scene 4. That is, the integration is made at the point shown by a broken line in FIG. 6C.

When there is only one adjacent scene as scene 8, the CPU 101 sets the one adjacent scene as the target of integration.

Accordingly, scene integration is made between the scenes before and after the points shown by broken lines illustrated in FIG. 6C. The scene integration includes updating information indicating the image files in the scene according to the scenes after the integration, for example. Specifically, the CPU 101 integrates the scenes such that there is a match between the number of scenes and the number of double-page spreads. Descriptions will be given as to the case where the number of scene segments is eight and the designated number of double-page spreads is six as illustrated in FIG. 6A as an example. FIG. 6C illustrates the results of scene integration from FIG. 6A. The scenes before and after the points shown by broken lines are integrated to change the number of segments to six.

In S418, the CPU 101 executes double-page spread allocation by the double-page spread allocating unit 209. Through S414 to S417, the number of scene segments and the number of designated double-page spreads become the same. The CPU 101 allocates the segmented data groups from the beginning to the double-page spreads from the beginning in order of shooting date and time. Specifically, the CPU 101 allocates the sub image groups to the double-page spreads of the album in the order of shooting date and time. This makes it possible to create the album in which the sub image groups are aligned in the order of shooting date and time.

In S419, the CPU 101 executes image selection by the image selection unit 210. Descriptions will be given as to an example in which four image data are selected from the segments of the image data group allocated to a double-page spread with reference to FIGS. 9A to 9I. A double-page spread is an area of two pages. However, each of the first and last double-page spreads is an area of one page.

FIG. 9A illustrates the time difference in the shooting date and time between the image data at the earliest shooting date and time and the image data at the latest shooting date and time out of the segmented image data group allocated to a double-page spread (divided shooting period), in other words, the shooting period of the segmented image data group. In this case, the image data are selected for the main slot and the sub slot in this order. In this example, the template corresponding to the double-page spread includes the one main slot 1002. Accordingly, the image data selected at first is the image data for the main slot. From the image data corresponding to the divided shooting period illustrated in FIG. 9B, the CPU 101 selects image data (1) with the highest score for the main slot added in S416 as image data for the main slot.

The second and subsequently selected image data are the image data for the sub slot. The second and subsequent image data are selected by a method as described below such that the image data do not concentrate on one part of the shooting period. First, the CPU 101 divides the divided shooting period into two as illustrated in FIG. 9C. Next, as illustrated in FIG. 9D, the CPU 101 selects second image data from the image data generated during the divided shooting period in which the first image data is not selected (the period shown by a solid line in the drawing). As the second image data, the CPU 101 selects image data (2) with the highest score for the sub slot from the image data generated during the divided shooting period in which the first image data is not selected. Next, the CPU 101 further divides each of the divided shooting periods illustrated in FIG. 9D into two as illustrated in FIG. 9E. As illustrated in FIG. 9F, the CPU 101 selects third image data from the image data generated during a divided shooting period in which none of the first image data and second image data is selected (the period shown by a solid line in the drawing). As the third image data, the CPU 101 selects image data (3) with the highest score for the sub slot from the image data generated during the divided shooting period in which none of the first image data and second image data is selected. As fourth image data, the CPU 101 selects the image data with the highest score for the sub slot from the image data generated during the divided shooting period in which none of the first to three image data is selected.

Next, descriptions will be given as to an example in which there is no image generated during the divided shooting period in which none of the first to third image data is selected and no fourth image data can be selected from the image data generated during the divided shooting period. As illustrated in FIG. 9G, it is assumed that there is no image data generated during the divided shooting period (shaded in the drawing) in which no image data is selected. In that case, the CPU 101 further divides each of the divided shooting periods into two as illustrated in FIG. 9H. Next, as illustrated in FIG. 9I, the CPU 101 selects the fourth image data from the images generated during a divided shooting period in which no image data is yet selected other than the divided shooting period in which it is recognized that there is no image data generated (the period shown by a solid line in the drawing). The CPU 101 selects, as the fourth image data, image data (4) with the highest score for the sub slot from the image data generated during the divided shooting period.

FIG. 4 is referred to again. In S420, the CPU 101 decides image layout by the image layout unit 212. Descriptions will be given as to an example in which the contents of the designated template information indicate that the number of the slots is three, and templates (a) to (p) illustrated in FIG. 10 corresponding to the template information are used.

First, the CPU 101 acquires the plurality of templates ((a) to (p) illustrated in FIG. 10) according to the template information designated by the album creation condition designation unit 201. Next, the CPU 101 decides the image layout for a double-page spread to be processed by the image layout unit 212. At this time, the CPU 101 first decides the template suitable for the image data selected in S419 from the plurality of acquired templates.

In the present embodiment, the image data earlier in the shooting date and time is laid out in the upper left slots and the image data later in the shooting date and time is laid out in the lower right slots, of the template. Accordingly, from the templates (a) to (p) illustrated in FIG. 10, the CPU 101 first selects the templates in which the position of the main slot corresponds to the order of the shooting date and time of the image data representing the main image. That is, for example, when the image data representing the main image is in the third place in the order of the shooting date and time, the CPU 101 selects the templates in which the main slot is the third one of all the slots from the left. The image data are sorted in advance in the order of the shooting date and time so that the CPU 101 can grasp the order of the shooing date and time of the image data indicating the main image. In addition, from the thus selected templates, the CPU 101 finally selects the template in which the aspect ratio of the slot where the main image is to be arranged is identical (or close) to the aspect ratio of the main image.

The CPU 101 selects the template suitable for the sub image from the templates (a) to (p) illustrated in FIG. 10. Specifically, the CPU 101 first selects the templates in which the position of the sub slot corresponds to the order of the shooting date and time of the image data indicating the sub image. In addition, from the thus selected templates, the CPU 101 finally selects the template in which the aspect ratio of the sub slot is identical (or close) to the aspect ratio of the sub image.

In this example, it is assumed that the shooting dates and times of the images indicated by the three image data are in the order as illustrated in (a) of FIG. 10. It is also assumed that an image 1005 is an image for the main slot (main image) and an image 1006 and an image 1007 are images for the sub slots (sub images).

As described above, in the present embodiment, the image data earlier in the shooting date and time is laid out in the upper left slots and the image data later in the shooting date and time is laid out in the lower right slots, of the template. The image 1005 as the main image is latest in the shooting date and time and is vertically oriented, and thus the CPU 101 selects templates (a) to (d) illustrated in FIG. 10.

The image 1006 as a sub image is earliest in the shooting date and time and is vertically oriented. The image 1007 as a sub image is second latest in the shooting date and time and is horizontally oriented. Accordingly, the CPU 101 selects the template (b) illustrated in FIG. 10. At this time, the CPU 101 specifies in which sub slots which sub images are to be arranged.

In this way, in S425, the CPU 101 decides the templates for use in the generation of the layout image and in which slots of the templates which images are to be laid out. Specifically, the CPU 101 manages the information on the slots included in the selected templates in association with the image data corresponding to the images to be laid out in the slots.

In S421, the CPU 101 executes image correction by the image correction unit 214. As image correction, dodging correction (luminance correction), red-eye correction, and contrast correction are executed, for example.

In S422, the CPU 101 generates layout information by the layout information output unit 215. Specifically, the CPU 101 manages the image data corresponding to the slots having undergone the image correction in S421, in association with the slots in the templates selected in S420. Then, the CPU 101 generates bit map data in which the images are laid out in the templates. At this time, the CPU 101 lays out the images in a scaled or non-scaled manner according to the size information of the slots.

In S423, the CPU 101 determines whether S419 to S422 are completed on all the double-page spreads. When not determining that S419 to S422 are completed, the CPU 101 repeats S419 and the subsequent steps. When determining that S419 to S422 are completed, the CPU 101 terminates the automatic layout process illustrated in FIG. 4.

After terminating the automatic layout process, the CPU 101 displays the layout image in which the images are arranged in the templates on the display device 105 based on the generated layout information. At this time, the CPU 101 may display a plurality of layout images for creating one album. In addition, the CPU 101 may transmit the generated layout information to a printer such as the image forming apparatus 200 to print the layout image. The layout image is printed to create the album.

In the foregoing automatic layout process, the templates and the image data are automatically selected in the album creation application (without accepting a selection instruction by the user) to generate the layout image. However, the images represented by the layout information do not necessarily include the templates and the images represented by the image data. This is because the layout information in the present embodiment is used to create an album which includes some areas where no images represented by image data are printed, called end paper, fly leaf, title page, and colophon, for example. In the present embodiment, the layout information also represents images corresponding to the end paper, fly leaf, title page, and colophon. The data representing these images is not generated by the automatic layout process as described above. Accordingly, the data generated in advance for the images corresponding to the end paper, fly leaf, title page, and colophon is included in the layout information at some timing.

In the present embodiment, the details of the automatic layout process are not limited to the foregoing ones. For example, the method for selection of the templates for use in the album and the method for selection of the image data representing images to be arranged in the templates are not limited to the foregoing ones. At least, the layout information is preferably generated without the user having to select the templates for use in the album or the image data representing the images to be arranged in the templates.

<Editing of the Album>

After generating the layout information as described above, the CPU 101 displays a screen for accepting the editing of the album represented by the generated layout information. On this screen, the user can check the contents of the album represented by the layout information generated by the automatic layout process. Hereinafter, this screen will be called editing screen. In the present embodiment, on the editing screen, one of the plurality of double-page spreads of the album represented by the generated layout information is displayed in an enlarged manner. The double-page spreads to be displayed can be switched by the user operation.

On the editing screen, the user can change the templates of the album represented by the layout information generated by the automatic layout process. A process for changing the templates and executing the automatic layout process again will be called template change process.

Figure 12:
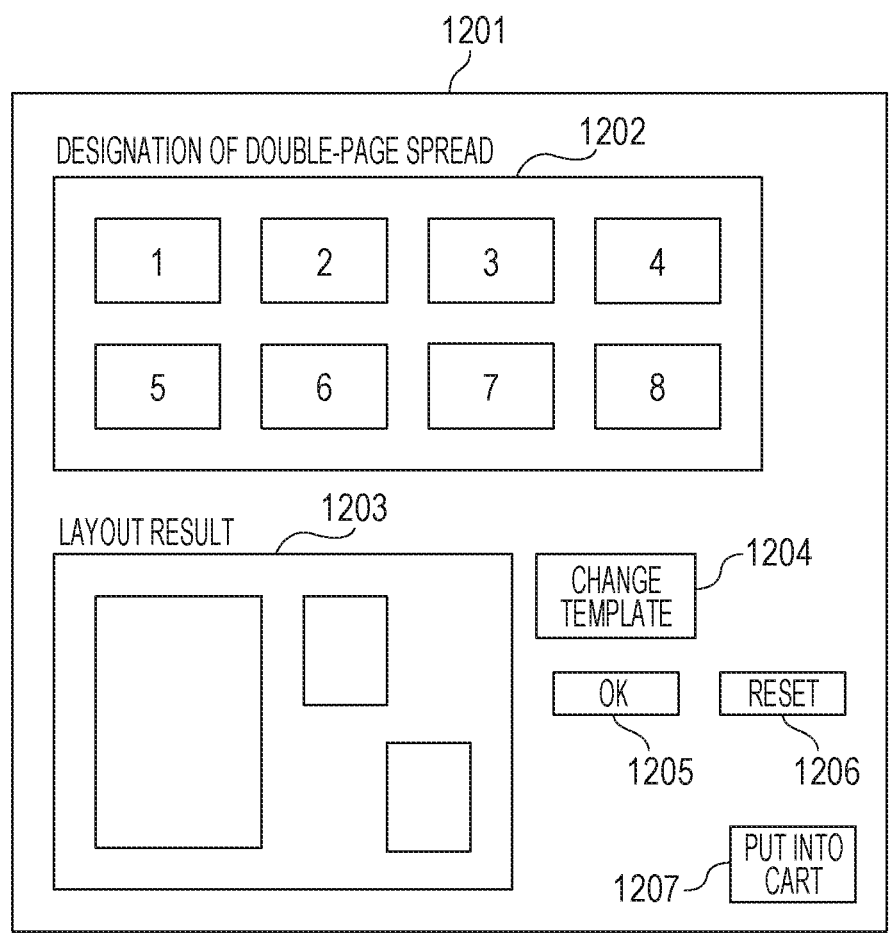
FIG. 12 is a diagram illustrating an editing screen provided by the album creation application.

FIG. 12 is a diagram illustrating an example of an editing screen 1201 provided by the album creation application. The editing screen 1201 is displayed on the display device 105.

A double-page spread designation area 1202 is an area for accepting the designation of a double-page spread to be displayed in a layout result display area 1203 by the user's click operation with the pointing device 107. In this case, the album to be created by automatic layout includes eight double-page spreads, and the double-page spread images corresponding to the double-page spreads are displayed in the double-page spread designation area 1202.

The layout result display area 1203 displays the layout result corresponding to the double-page spread (double-page spread as an editing target) designated by the user via the double-page spread designation area 1202 in an enlarged manner. The layout result display area 1203 may display the album not by double-page spread but by page. There is no particular limit on the double-page spread to be displayed in the layout result display area 1203 displayed immediately after the automatic layout process. For example, among the plurality of double-page spreads, the first double-page spread (with the smallest double-page spread number) may be displayed or the double-page spread in the highest importance level may be displayed immediately after the automatic layout process. In the present embodiment, the double-page spread to be displayed in the layout result display area 1203 displayed immediately after the automatic layout process is the first one of the double-page spreads (the double-page spread with the double-page spread name "front cover").

A template change button 1204 is a button for changing the template used for the layout image corresponding to the double-page spread as an editing target and suggesting a new layout image to the user. The CPU 101 accepts an instruction for changing the template by accepting the press of the template change button 1204 by the user's click operation with the pointing device 107. When the template change button 1204 is pressed, the template change process is executed to change the layout image for the double-page spread displayed in the layout result display area 1203. Specifically, the template used for the layout image displayed at the time of the press of the template change button 1204 is replaced by a different template to display a newly generated layout image. In the present embodiment, the images arranged in the slots are identical between the pre-change layout image and the post-change layout image. The detailed procedure for changing the templates will be described later. In the present embodiment, only the layout image for the double-page spread displayed in the layout result display area 1203 is changed by the press of the template change button 1204. However, the present disclosure is not limited to this embodiment. For example, a plurality of layout images may be changed in one batch.

An OK button 1205 is a button for specifying the layout image displayed in the layout result display area 1203 after the template change process, as the layout image to be printed corresponding to the double-page spread specified as an editing target double-page spread. The user presses the OK button 1205 when he/she likes the layout image newly displayed by the template change process.

A reset button 1206 is a button for returning from the new layout image displayed in the layout result display area 1203 after the template change process to the layout image having been displayed before the display of the new layout image. In the present embodiment, when the reset button 1206 is pressed, the image to be displayed in the layout result display area 1203 is returned to the layout image to be printed corresponding to the double-page spread specified as editing target double-page spread.

A put-into-cart button 1207 is a button for ordering the album created by the automatic layout. When the user executes a predetermined ordering operation after the press of the put-into-cart button 1207, the layout information set at that time is transmitted to the external server 400 (uploaded) so that the album is created based on the layout information. Accordingly, the user edits arbitrarily the layout information for the album by the template change process and then presses the put-into-cart button 1207.

The issues of the present disclosure will be described. The user performs the template change process when he/she does not like the template used for the layout image generated by the automatic layout process described in the flowchart of FIG. 4 or he/she wishes to see layout images in other templates. At this time, in a mode in which a plurality of layout images in a plurality of other templates is suggested to the user who is prompted to select the post-change layout image, for example, the user has to search for the appropriate (highly satisfactory) layout image by himself/herself. In addition, in some mode, each time an instruction for the template change process from the user is accepted, one post-change layout image is suggested. In this mode, if the layout images suggested on a priority basis are possibly low satisfactory for the user, the user also has to search for the highly satisfactory layout image by himself/herself.

Accordingly, in the present embodiment, when an instruction for the template change process from the user is accepted, layout images likely to be highly satisfactory for the user are suggested to the user on a priority basis. Specifically, in the present embodiment, layout images in templates with a low degree of similarity to the template used for the layout image as a target of the template change process are suggested to the user on a priority basis.

Figure 11:
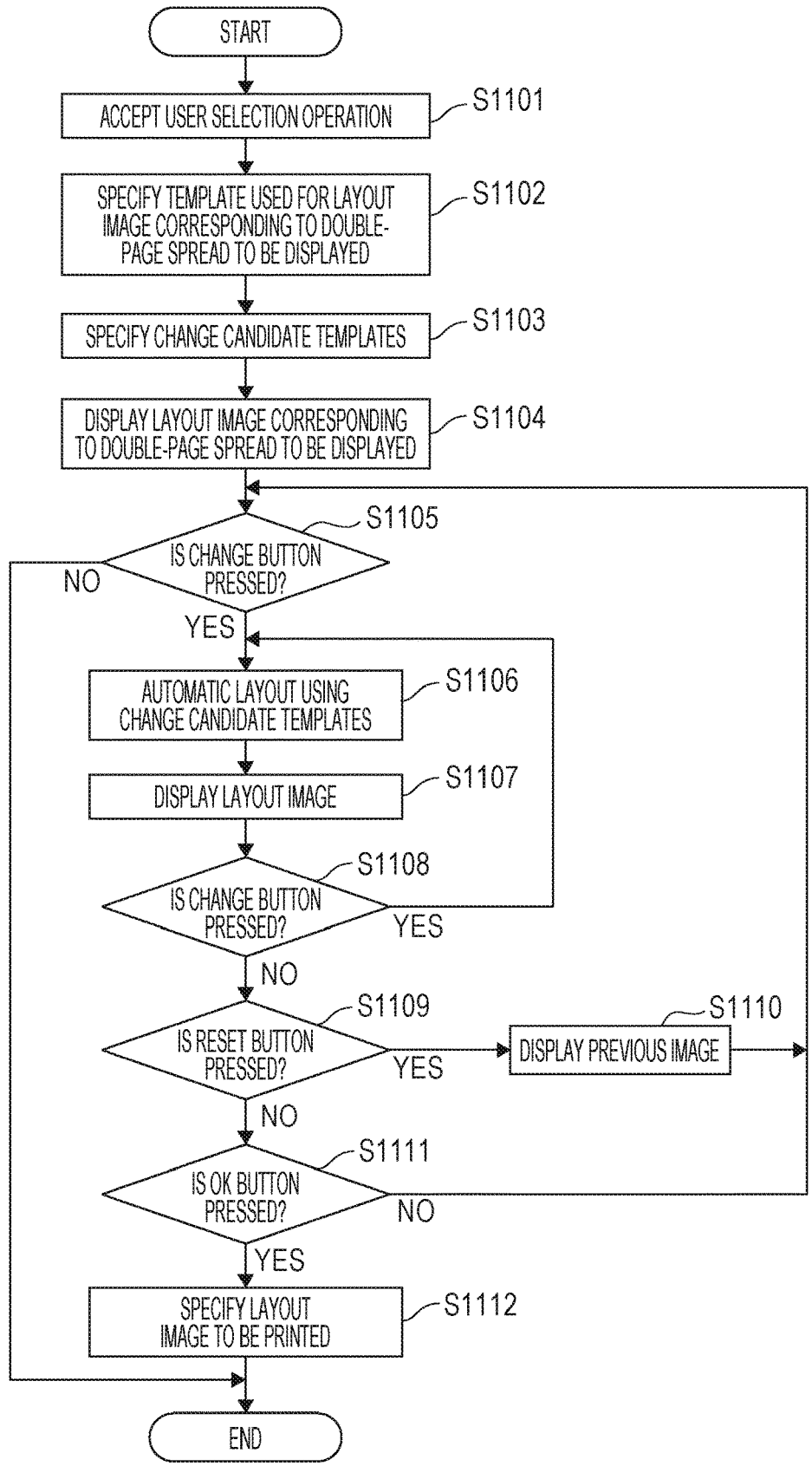
FIG. 11 is a flowchart of a template change process.

The template change process will be described below in detail. FIG. 11 is a flowchart of a process executed with the editing screen 1201 displayed in the present embodiment. The flowchart illustrated in FIG. 11 is implemented by the CPU 101 reading the program corresponding to the album creation application from the HDD 104 into the ROM 102 or the RAM 103 and executing the same, for example.

In S1101, the CPU 101 accepts a user operation for designating a double-page spread as an editing target from the double-page spreads displayed in the double-page spread designation area 1202.

In S1102, the CPU 101 specifies the double-page spread selected by the accepted operation as an editing target double-page spread, and specifies the template used for the layout image corresponding to the editing target double-page spread (the pre-change layout image).

In S1103, the CPU 101 specifies the template (change candidate template) for use in the case where the template change process is to be performed on the layout image corresponding to the editing target double-page spread. In the present embodiment, specifically, the CPU 101 specifies the template with a low degree of similarity in slot aspect ratio to the template used for the layout image corresponding to the editing target double-page spread, as change candidate template.

In the present embodiment, the template with a low degree of similarity in slot aspect ratio is specified from the template group including (a) to (p) illustrated in FIG. 10 as a template group with a high degree of similarity in the number of slots. The slots in the templates (a) to (p) illustrated in FIG. 10 are assigned numbers in order from the left side. In the present embodiment, the degrees of similarity in slot aspect ratio are calculated by comparison between the slots with the same number.

FIG. 13A is a table indicating the values relating to the degree of similarity between the templates (a) to (p) illustrated in FIG. 10. This table provides the values relating to the degree of similarity between the templates shown in the rows and the templates shown in the columns. As the value relating to the degree of similarity is smaller, the degree of similarity between the two templates is higher (more similar).

A method for calculating the degree of similarity between the template used for the layout image corresponding to the editing target double-page spread and another template will be described. First, the elements as a target of comparison for the degree of similarity between the templates (the slot aspect ratio in this example) are expressed in vector. The distances between the expressed individual vectors constitute the values relating to the degree of similarity between the templates.

In this example, the aspect ratio of the slot with number n in a template (x) is expressed as ARx (n). In that case, the vector of the slot aspect ratio in the template with m slots is expressed as follows:

$$\overrightarrow{ARx} = [ARx(n) ARx(n+1) ARx(n+2) \ldots ARx(m)] \quad [\text{Math. 1}]$$

In addition, a distance d between the vector indicated by the template (x) and the vector indicated by a template (y) is expressed as follows:

$$d = \sqrt{\begin{array}{l}|ARx(n) - ARy(n)|^2 + |ARx(n+1) - ARy(n+1)|^2 + \\ |ARx(n+2) - ARy(n+2)|^2 \ldots + |ARx(m) - ARy(m)|^2\end{array}} \quad [\text{Math 2}]$$

For example, when a slot is a height of 4 and a width of 3, the aspect ratio of the slot is 4/3. Accordingly, the vector indicated by a template (a) illustrated in FIG. 10 is expressed as follows:

$$\begin{bmatrix} \frac{4}{3} & \frac{4}{3} & \frac{4}{3} \end{bmatrix} \quad [\text{Math. 3}]$$

The vector indicated by a template (b) is expressed as follows:

$$\begin{bmatrix} \frac{4}{3} & \frac{4}{3} & \frac{3}{4} \end{bmatrix} \quad [\text{Math. 4}]$$

Further, the distance d between the vector indicated by the template (a) and the vector indicated by the template (b) is expressed by the following equation:

$$d = \sqrt{\left|\frac{4}{3} - \frac{4}{3}\right|^2 + \left|\frac{4}{3} - \frac{4}{3}\right|^2 + \left|\frac{4}{3} - \frac{3}{4}\right|^2} = 0.58 \quad [\text{Math. 5}]$$

In this way, the calculation results of the values relating to the degree of similarity between the templates are shown in the table illustrated in FIG. 13A. Referring to this table, the CPU 101 specifies the templates with a low degree of similarity to the template used for the layout image corresponding to the editing target double-page spread (with a large value relating to the degree of similarity) as change candidate templates. There is no particular limit on the number of the change candidate templates, although there are four in the present embodiment.

Specifically, when the template used for the pre-change layout image is the template (a), for example, the row corresponding to the template (a) in the table are referred to. In addition, as illustrated in FIG. 13B, the values relating to the degree of similarity are in the columns re-arranged in the ascending order. After the re-arrangement in this way, the four templates with a low value relating to the degree of similarity are specified as change candidate templates.

In the foregoing mode, the values relating to the degree of similarity of all the combinations in the template are determined. However, the present disclosure is not limited to this mode. For example, the values relating to the degree of similarity between the template used for the layout image corresponding to the editing target double-page spread and another template may be determined. In addition, the album creation application may hold in advance the table illustrated in FIG. 13A instead of generating the table illustrated in FIG. 13A by calculation. In this case, the CPU 101 extracts the values corresponding to the template used for the layout image corresponding to the editing target double-page spread from the table held in advance, and specifies the change candidate templates.

As described above, specified in the present embodiment are templates identical in elements other than the slot aspect ratio to those of the template used for the layout image corresponding to the editing target double-page spread but having a low degree of similarity in the slot aspect ratio to that of the layout image corresponding to the editing target double-page spread. That is, the templates with a low degree of similarity in the slot aspect ratio are specified from the template group with a high degree of similarity in the elements other than the slot aspect ratio.

However, the present disclosure is not limited to this mode. For example, templates with a low degree of similarity in an element other than the slot aspect ratio (the number of slots, the area of the slots, the shape of the slots, the order of the slots, the coordinate positions of the slots in the template, the number of overlaps between slots, and the number of coupling portions of slots) may be specified. The number of overlaps between slots refers to the number of overlapping portions of slots in the template, and the number of coupling portions of slots refers to the number of portions not overlapping but coupling (contacting) of slots in the template. In addition, the templates with a low degree of similarity in not only one element but also two elements may be specified.

The user may be allowed to designate in what element the templates with a low degree of similarity is to be specified. Further, in the mode in which a plurality of elements can be designated, weighting may be executable in relation to the importance level of low degree of similarity in each of the elements. In that case, the templates with a lower degree of similarity in the element assigned a greater weight are specified with a priority over the templates with a lower degree of similarity in the element assigned a lower weight.

There is no limit on the template group from which the templates with a low degree of similarity are to be selected. In the present embodiment, the templates with a low degree of similarity are selected from the template group with the same number of slots as that of the slots in the template used for the layout image corresponding to the double-page spread to be displayed. Alternatively, the templates with a low degree of similarity may be selected from a different template group.

In S1104, the CPU 101 displays the layout image corresponding to the editing target double-page spread in the layout result display area 1203.

In S1105, the CPU 101 determines whether the press of the template change button 1204 by the user is accepted. When making a YES determination, the CPU 101 proceeds to S1106, and when making a NO determination, the CPU 101 terminates the process in the flowchart.

In S1106, the CPU 101 executes the template change process. Specifically, the CPU 101 first specifies the template with the lowest degree of similarity (the largest value relating to the degree of similarity) from the change candidate templates not yet used in the template change process. Then, the CPU 101 uses the specified template (post-change template) to perform S420 to S422 again to generate new layout information. When all the change candidate templates are displayed due to repetition of the process, the CPU 101 makes a reset so that all the change candidate templates are yet to be used and then executes the process.

In S1107, the CPU 101 displays the layout image (post-change layout image) represented by the generated layout information in the layout result display area 1203. In the present embodiment, the images arranged in the slots of the layout image displayed after the template change process are identical to the images arranged in the slots of the layout image having been displayed before the template change process.

In S1108, the CPU 101 determines whether the press of the template change button 1204 by the user is accepted. When making a YES determination, the CPU 101 proceeds again to S1106, and when making a NO determination, the CPU 101 proceeds to S1109.

In S1109, the CPU 101 determines whether the press of the reset button 1206 (reset operation) by the user is accepted. When making a YES determination, the CPU 101 proceeds again to S1110, and when making a NO determination, the CPU 101 proceeds to S1111.

In S1110, the CPU 101 returns (resets) from the new layout image displayed in the layout result display area 1203 after the template change process to the layout image having been displayed before the display of the new layout image. The layout image displayed by resetting may be the layout image having been displayed immediately before the display of the layout image after the reset button 1206 was pressed. In addition, the layout image displayed by resetting may be the layout image displayed by designating the double-page spread in the double-page spread designation area 1202 (the layout image having been displayed before the template change process) or may be the layout image having been displayed when the OK button 1205 was pressed. After that, the CPU 101 proceeds again to S1105.

In S1111, the CPU 101 determines whether the press of the OK button 1205 by the user is accepted. When making a YES determination, the CPU 101 proceeds to S1112, and when making a NO determination, the CPU 101 proceeds again to S1105.

In S1112, the CPU 101 specifies the layout image having been displayed at the time of press of the OK button 1205 as the layout image to be printed corresponding to the double-page spread specified as the editing target double-page spread. Before the OK button 1205 is pressed, the CPU 101 specifies the layout image generated by automatic layout before the template change process or the layout image having been displayed at the time of press of the OK button 1205 as the layout image to be printed.

After that, the CPU 101 terminates the process. Even after the press of the OK button 1205, the template change process may be executed.

The user can change and switch only the template for the layout image to be printed, by the template change process as described above. After the template change process, the user presses the put-into-cart button 1207 to execute the album ordering process (output operation), thereby outputting the layout image to be printed after the switching as an album. In addition, the user can transmit the image data representing the layout image to be printed after the switching to a device outside of the image processing apparatus 100, for example.

As described above, in the present embodiment, when an operation for changing the template for a layout image is accepted, the layout images using the templates with a low degree of similarity to the template used for the pre-change layout image are suggested to the user.

Accordingly, the layout images using the templates possibly highly satisfactory for the user can be suggested to the user. Eventually, the user can select easily the appropriate (highly satisfactory) layout image as the post-change layout image.

Other Embodiments

In the foregoing embodiment, the layout image using a template with a low degree of similarity to the template used for the pre-change layout image is displayed as the post-change layout image. The method for displaying the post-change layout image is not limited to the foregoing one. For example, the layout image using the template with a low degree of similarity to the template used for the pre-change layout image and another layout image may be displayed to the user at the same time. In addition, at that time, the layout image using the template with a low degree of similarity to the template used for the pre-change layout image may be displayed in a more emphasized and prioritized manner than the other layout image. In addition, a plurality of layout images using different templates with a low degree of similarity to the template used for the pre-change layout image may be displayed. At that time, the layout images using the template with a lower degree of similarity to the template used for the pre-change layout image may be displayed in a more emphasized and prioritized manner than the other layout images. As specific examples for display in a more emphasized manner, a predetermined icon indicating a higher priority may be added to the layout images using the template with a lower degree of similarity to the template used for the pre-change layout image, or the frame line or color of the layout images may be made different from that of the other layout images.

For example, the layout image using a template with a high degree of similarity to the template used for the pre-change layout image may be displayed as the post-change layout image. Whether to display the layout image using a template with a high degree of similarity to the template used for the pre-change layout image on a priority basis or display the layout image using a template with a low degree of similarity on a priority basis may be switchable by the user operation or the like.

In the foregoing embodiment, the template change process is executed on the layout image generated by automatic layout. The present disclosure is not limited to this embodiment. For example, the template change process of the present embodiment may be executed on the layout image generated by the user manually selecting the images to be arranged in the template or slots. That is, the layout image using the template with a low degree of similarity to the template selected by the user and the layout image using the images selected by the user may be suggested to the user on a priority basis.

In the foregoing embodiment, the template to be used for the post-change layout image is specified by the degree of similarity to the template used in the layout image corresponding to the editing target double-page spread. However, the present disclosure is not limited to this mode but the template to be used for the post-change layout image may be specified by the degree of similarity to the template used for the layout image corresponding to the double-page spread other than the editing target double-page spread. For example, the template to be used for the post-change layout image may be specified by the degree of similarity to the template used for the layout image corresponding to the double-page spreads (or either of them) before and after the editing target double-page spread. In addition, the template may be specified in consideration taking into account both the degree of similarity to the template used for the layout image corresponding to the editing target double-page spread and the degree of similarity to the template used in the layout image corresponding to the double-page spreads (or either of them) before and after the editing target double-page spread.

For example, when the template change process is performed on the layout image corresponding to a double-page spread other than the editing target double-page spread, the result of the template change process may be referred to in the template change process on the layout image corresponding to the editing target double-page spread. For example, in the template change process on the layout image corresponding to a double-page spread other than the editing target double-page spread, a template with regular square slots tends to be selected as a template to be used for the post-change layout image. In that case, referring to the tendency, the template corresponding to the tendency may be used in the template change process on the layout image corresponding to the editing target double-page spread.

In the foregoing embodiment, when an instruction from the user is accepted, the layout image using a template different from the template used for the layout image corresponding to the editing target double-page spread is displayed. However, the present disclosure is not limited to this mode but the layout image using images different from (with a low degree of similarity to) the images used for the layout image corresponding to the editing target double-page spread may be displayed, for example. In this case, the same template may be used before and after change. That is, in response to a user instruction, the layout image different at least partly from the layout image corresponding to the editing target double-page spread and with a low degree of similarity to that layout image is preferably displayed. On the other hand, for example, when an instruction from the user is accepted, a template that has no image arranged and is different from the template used for the layout image corresponding to the editing target double-page spread may be displayed.

The foregoing embodiment can also be implemented by executing the following processes. That is, software (program) for carrying out the functions of the foregoing embodiment is supplied to a system or a device via a network or any of various storage media, and a computer (CPU or MPU) in the system or the device reads and executes the program. The program may be executed on one computer or a plurality of computers in cooperation. All the processes described above may not be necessarily implemented by software but some or all of the processes may be implemented by hardware such as ASIC. In addition, all the processes may not be necessarily performed by one CPU but may be performed by a plurality of CPUs in cooperation as appropriate.

The present disclosure provides technological improvements or unconventional solutions in advancements and/or improvements in image processing technology through use of specific manners of use with specific limitations on available data and configurational states.

According to the present disclosure, it is easy for the user to specify a highly satisfactory layout image as a post-change layout image and a highly satisfactory template as a template to be used for a post-change layout image.

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU), or the like), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-193784, filed Oct. 3, 2017, which is hereby incorporated by reference herein in its entirety.

What is claimed is:

1. A control method of an image processing apparatus, the method comprising:

displaying on a display unit a pre-change layout image in which an arrangement image is arranged in a template;

accepting a change instruction for displaying a post-change layout image different at least partly from the pre-change layout image on the display unit;

determining a degree of similarity each between the post-change layout image that is each image included in a post-change layout image group and the pre-change layout image; and executing, in a case that the change instruction is accepted, based on the determined degree of similarity to the pre-change layout image, at least one of a process for displaying a first post-change layout image on the display unit with a priority over a second post-change layout image included in the post-change layout image group with a higher degree of similarity to the pre-change layout image, determined in the determining, than the first post-change layout image included in the post-change layout image group and a process for displaying the first post-change layout image on the display unit in a more emphasized manner than the second post-change layout image, wherein the degree of similarity in a predetermined element between the template used for the pre-change layout image and the template used for the second post-change layout image is higher than the degree of similarity in the predetermined element between the template used for the pre-change layout image and the template used for the first post-change layout image, and wherein the post-change layout image with the lowest degree of similarity to the pre-change layout image is specified based on a table showing a value relating to the degree of similarity in the predetermined element between the template used for the pre-change layout image and a template identical to the former template in one or more of elements other than the predetermined element.

2. The control method according to claim 1, wherein the post-change layout image is a layout image in which at least the arrangement image used for the pre-change layout image is arranged in a template different from the template used for the pre-change layout image.

3. The control method according to claim 2, wherein a degree of similarity between the template used for the pre-change layout image and the template used for the second post-change layout image is higher than a degree of similarity between the template used for the pre-change layout image and the template used for the first post-change layout image.

4. The control method according to claim 1, further comprising specifying a post-change layout image with the lowest degree of similarity to the pre-change layout image from the post-change layout image group, wherein in a case that the change instruction is accepted, at least one of a process for displaying the specified post-change layout image specified as the post-change layout image with the lowest degree of similarity to the pre-change layout image on the display unit with a priority over the unspecified post-change layout image not specified as the post-change layout image with the lowest degree of similarity to the pre-change layout image and a process for displaying the specified post-change layout image specified as the post-change layout image with the lowest degree of similarity to the pre-change layout image on the display unit in a more emphasized manner than the unspecified post-change layout image not specified as the post-change layout image with the lowest degree of similarity to the pre-change layout image is executed.

5. The control method according to claim 1, wherein the predetermined element is one of an aspect ratio of a slot that is a region included in a template where an image is arranged, a shape of the slot, an area of the slot, the number of the slots, a coordinate position of the slot in the template, the number of overlaps between the slots, and the number of coupling portions of the slots.

6. The control method according to claim 1, wherein, after at least the process for displaying the first post-change layout image on the display unit with a priority over the second post-change layout image or the process for displaying the first post-change layout image on the display unit in a more emphasized manner than the second post-change layout image is executed upon acceptance of the change instruction, when the change instruction is accepted again, at least a process for displaying a third post-change layout image with a higher degree of similarity to the pre-change layout image than the first post-change layout image on the display unit with a priority over a fourth post-change layout image with a higher degree of similarity to the pre-change layout image than the third post-change layout image, or a process for displaying the third post-change layout image on the display unit in a more emphasized manner than the fourth post-change layout image is executed.

7. The control method according to claim 1, wherein, in a case that the change instruction is accepted, the pre-change layout image is no longer displayed on the display unit.

8. The control method according to claim 1, further comprising accepting, after at least the process for displaying the first post-change layout image on the display unit with a priority over the second post-change layout image or the process for displaying the first post-change layout image on the display unit in a more emphasized manner than the second post-change layout image is executed upon acceptance of the change instruction, a reset operation, wherein in a case that the reset operation is accepted, the pre-change layout image is displayed on the display unit.

9. The control method according to claim 1, further comprising accepting, after at least the process for displaying the first post-change layout image on the display unit with a priority over the second post-change layout image or the process for displaying the first post-change layout image on the display unit in a more emphasized manner than the second post-change layout image is executed upon acceptance of the change instruction, an output operation, wherein in a case that the output operation is accepted, an output relating to the first post-change layout image is performed.

10. The control method according to claim 9, wherein the output relating to the first post-change layout image is printing of the first post-change layout image by an image forming apparatus or transmission of image data representing the first post-change layout image to outside of the image processing apparatus.

11. The control method according to claim 1, wherein the process for displaying the first post-change layout image on the display unit in a more emphasized manner than the second post-change layout image is at least one of a process for adding a predetermined icon to the first post-change layout image, a process for making a frame line of the first post-change layout image different from a frame line of the second post-change layout image, and a process for making a color of the first post-change layout image different from a color of the second post-change layout image.

12. The control method according to claim 1, wherein, in a case that the change instruction is accepted, the first post-change layout image is displayed on the display unit and the second post-change layout image is not displayed on the display unit to execute the process for displaying the first post-change layout image on the display unit with a priority over the second post-change layout image.

13. The control method according to claim 1, further comprising:
   selecting automatically one or more template from a plurality of templates without accepting a selection instruction from the user; and
   selecting automatically one or more image data from a plurality of image data without accepting a selection instruction from the user, wherein
   the pre-change layout image is an image in which an image represented by the selected image data is arranged in the selected template.

14. The control method according to claim 1, wherein the post-change layout image is a layout image in which at least an arrangement image different from the arrangement image used for the pre-change layout image is arranged in the template used for the pre-change layout image.

15. The control method according to claim 14, wherein the degree of similarity between the arrangement image used for the pre-change layout image and the arrangement image used for the second post-change layout image is higher than the degree of similarity between the arrangement image used for the pre-change layout image and the arrangement image used for the first post-change layout image.

16. A control method of an image processing apparatus comprising:
   displaying on a display unit a pre-change layout image in which an arrangement image is arranged in a template;
   accepting a change instruction for displaying a post-change layout image different at least partly from the pre-change layout image on the display unit;
   determining a degree of similarity each between the post-change layout image that is each image included in a post-change layout image group and the pre-change layout image; and
   executing, in a case that the change instruction is accepted, based on the determined degree of similarity to the pre-change layout image, at least one of a process for displaying a first post-change template on the display unit with a priority over a second post-change template included in the post-change layout image group with a higher degree of similarity to a template used for the pre-change layout image, determined in the determining, than the first post-change template included in the post-change layout image group and a process for displaying the first post-change template on the display unit in a more emphasized manner than the second post-change template,
   wherein the degree of similarity in a predetermined element between the template used for the pre-change layout image and the template used for the second post-change layout image is higher than the degree of similarity in the predetermined element between the template used for the pre-change layout image and the template used for the first post-change layout image, and
   wherein the post-change layout image with the lowest degree of similarity to the pre-change layout image is specified based on a table showing a value relating to the degree of similarity in the predetermined element between the template used for the pre-change layout image and a template identical to the former template in one or more of elements other than the predetermined element.

17. A control method of an image processing apparatus, the method comprising:
   displaying on a display unit a pre-change layout image in which an arrangement image is arranged in a template;
   accepting a change instruction for displaying a post-change layout image different at least partly from the pre-change layout image on the display unit;
   acquiring a value relating to the degree of similarity in the predetermined element between the template used for the pre-change layout image and a template identical to the former template in one or more of elements other than the predetermined element;
   determining a degree of similarity each between the post-change layout image that is each image included in a post-change layout image group and the pre-change layout image; and
   executing, in a case that the change instruction is accepted, based on the determined degree of similarity to the pre-change layout image, at least one of a process for displaying a first post-change layout image on the display unit with a priority over a second post-change layout image included in the post-change layout image group with a higher degree of similarity to the pre-change layout image, determined in the determining, than the first post-change layout image included in the post-change layout image group and a process for displaying the first post-change layout image on the display unit in a more emphasized manner than the second post-change layout image,
   wherein the value relating to the degree of similarity in the predetermined element is indicated by a distance between a vector based on the predetermined element in the template used for the pre-change layout image and a vector based on the predetermined element in the template identical to the former template in one or more of the elements other than the predetermined element,
   wherein a post change layout image with the lowest degree of similarity to the pre-change layout image is specified based on the acquired value, and
   wherein the degree of similarity in a predetermined element between the template used for the pre-change layout image and the template used for the second post-change layout image is higher than the degree of similarity in the predetermined element between the template used for the pre-change layout image and the template used for the first post-change layout image.

* * * * *